US012694647B2

(12) United States Patent
Joshi et al.

(10) Patent No.: US 12,694,647 B2
(45) Date of Patent: Jul. 28, 2026

(54) MESSAGE PASSING NETWORK BASED OBJECT SIGNATURE FOR OBJECT TRACKING

(71) Applicant: QUALCOMM Incorporated, San Diego, CA (US)

(72) Inventors: Avdhut Joshi, San Marcos, CA (US); Sajal Maheshwari, Seattle, WA (US); Ahmed Kamel Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 249 days.

(21) Appl. No.: 18/542,408

(22) Filed: Dec. 15, 2023

(65) Prior Publication Data

US 2024/0233331 A1      Jul. 11, 2024

Related U.S. Application Data

(60) Provisional application No. 63/478,636, filed on Jan. 5, 2023.

(51) Int. Cl.
G06V 10/764       (2022.01)
G06V 10/82       (2022.01)
G06V 20/58       (2022.01)

(52) U.S. Cl.
CPC ............ G06V 10/764 (2022.01); G06V 10/82 (2022.01); G06V 20/58 (2022.01)

(58) Field of Classification Search
CPC ....... G06V 10/764; G06V 10/82; G06V 20/58
See application file for complete search history.

(56) References Cited

U.S. PATENT DOCUMENTS

| | | | | |
|---|---|---|---|---|
| 11,960,294 | B2 * | 4/2024 | Chidlovskii | ............ G06T 7/136 |
| 2022/0383074 | A1 * | 12/2022 | Strathmann | .............. G06N 3/08 |
| 2023/0115719 | A1 * | 4/2023 | Sakhinana | ............. G06N 3/063 706/21 |
| 2024/0104377 | A1 * | 3/2024 | Gubbi Lakshminarasimha | .......... G16H 50/20 |
| 2024/0111950 | A1 * | 4/2024 | Chen | ....................... G06F 40/30 |

OTHER PUBLICATIONS

Fang Z., et al., "Multi-Object Tracking Based on Anchor-Free Detection and Message Passing Association", 2022 IEEE 17Th Conference On Industrial Electronics and Applications (ICIEA), IEEE, Dec. 16, 2022, pp. 1043-1050, XP034272410, abstract, figure 1.

(Continued)

*Primary Examiner* — Iriana Cruz
(74) *Attorney, Agent, or Firm* — Polsinelli

(57) ABSTRACT

Disclosed are systems, apparatuses, processes, and computer-readable media for processing image data. For example, an apparatus can compute initial embeddings from a plurality of images. The apparatus can construct a graph comprising nodes representing the initial embeddings. The apparatus can further perform, based on the graph, a plurality of message passing steps successively to generate final embeddings. The apparatus can classify, using a classification engine, one or more objects in each of the plurality of images based on the final embeddings. The apparatus can further compute a classification loss based on the classifying of the one or more objects.

20 Claims, 15 Drawing Sheets

1300

Compute Initial Embeddings From A Plurality Of Images
1310

Construct A Graph Comprising Nodes Representing The Initial Embeddings
1320

Perform, Based On The Graph, A Plurality Of Message Passing Steps Successively To Generate Final Embeddings
1330

Classify, Using A Classification Engine, One Or More Objects In Each Of The Plurality Of Images Based On The Final Embeddings
1340

Compute A Classification Loss Based On The Classifying Of The One Or More Objects
1350

(56) References Cited

OTHER PUBLICATIONS

Hsu H-M., et al., "Multi-Target Multi-Camera Tracking of Vehicles by Graph Auto-Encoder and Self-Supervised Camera Link Model", 2022 IEEE/CVF Winter Conference on Applications of Computer Vision Workshops (WACVW), IEEE, Jan. 4, 2022, pp. 489-499, XP034087276, the whole document.

International Search Report and Written Opinion—PCT/US2023/084654—ISA/EPO—Apr. 19, 2024.

Li J., et al., "Graph Networks for Multiple Object Tracking", 2020 IEEE Winter Conference on Applications of Computer Vision (WACV), IEEE, Mar. 1, 2020, pp. 708-717, XP033770998, the whole document.

Wang Y., et al., "Joint Object Detection and Multi-Object Tracking with Graph Neural Networks", 2021 IEEE International Conference on Robotics and Automation (ICRA), IEEE, May 30, 2021, pp. 13708-13715, XP033989462, abstract, figure 2.

* cited by examiner

100

102 — CPU

104 — GPU

106 — DSP

108 — NPU

110 — CONNECTIVITY

112 — MULTIMEDIA

114 — SENSORS

116 — ISPs

118 — MEMORY

120 — STORAGE

302

Fully Connected

304

Locally Connected

310

312

314

316

306

Convolutional

308

Image
500

Target Vehicle
508

Target Vehicle
504

Target Vehicle
506

Tracking
Vehicle 502

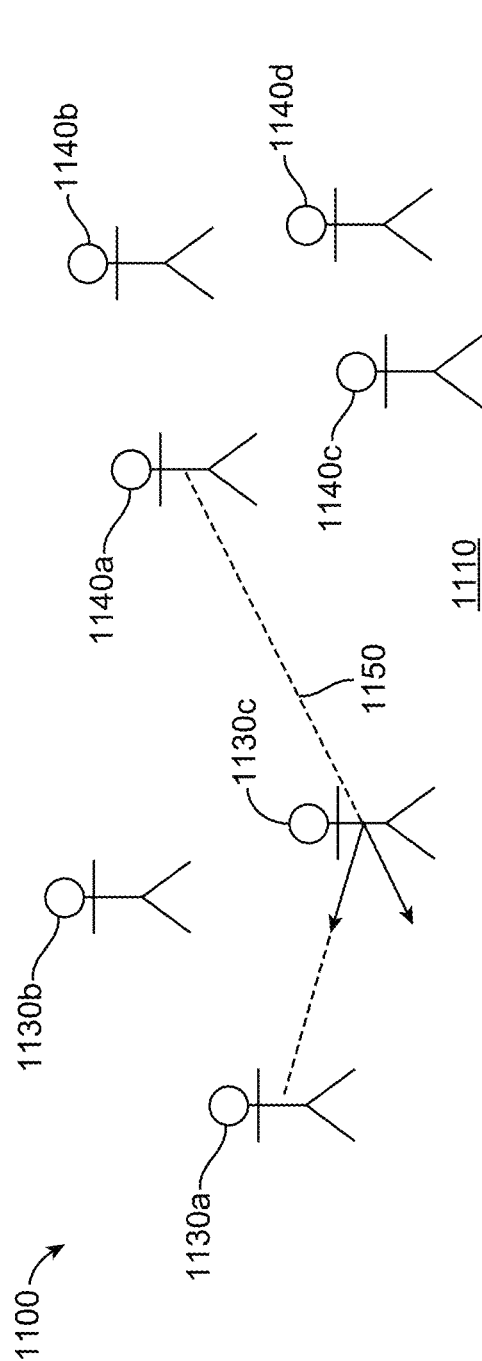
Triplet Loss
1110
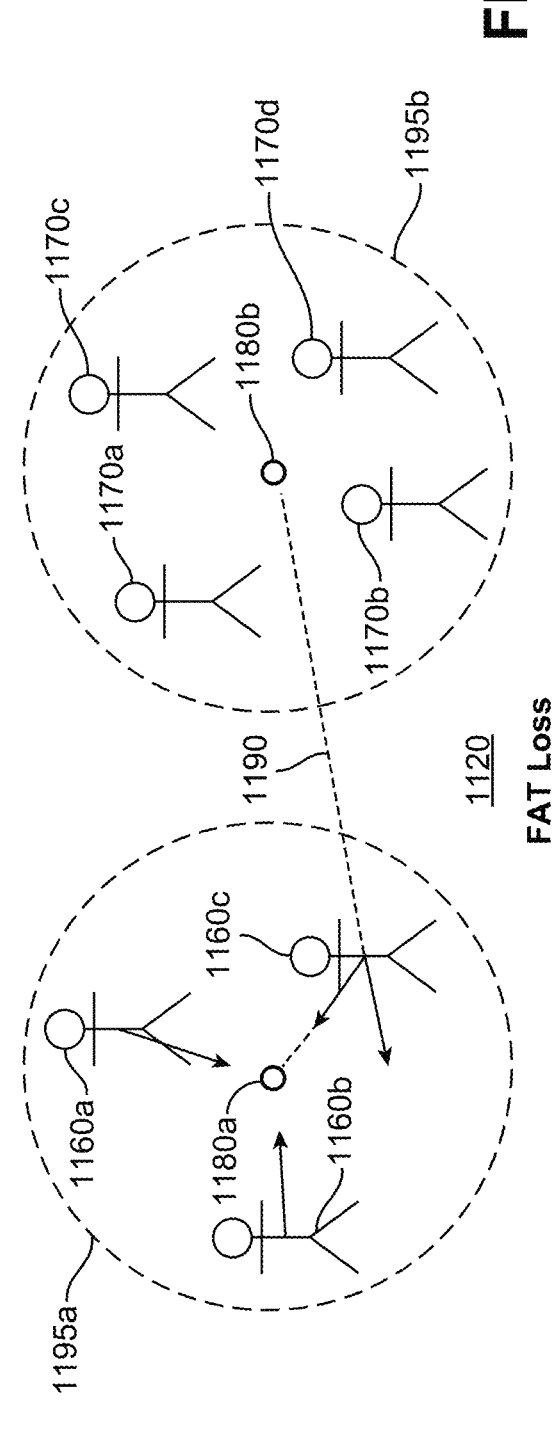
FAT Loss
1120
FIG. 11

1300

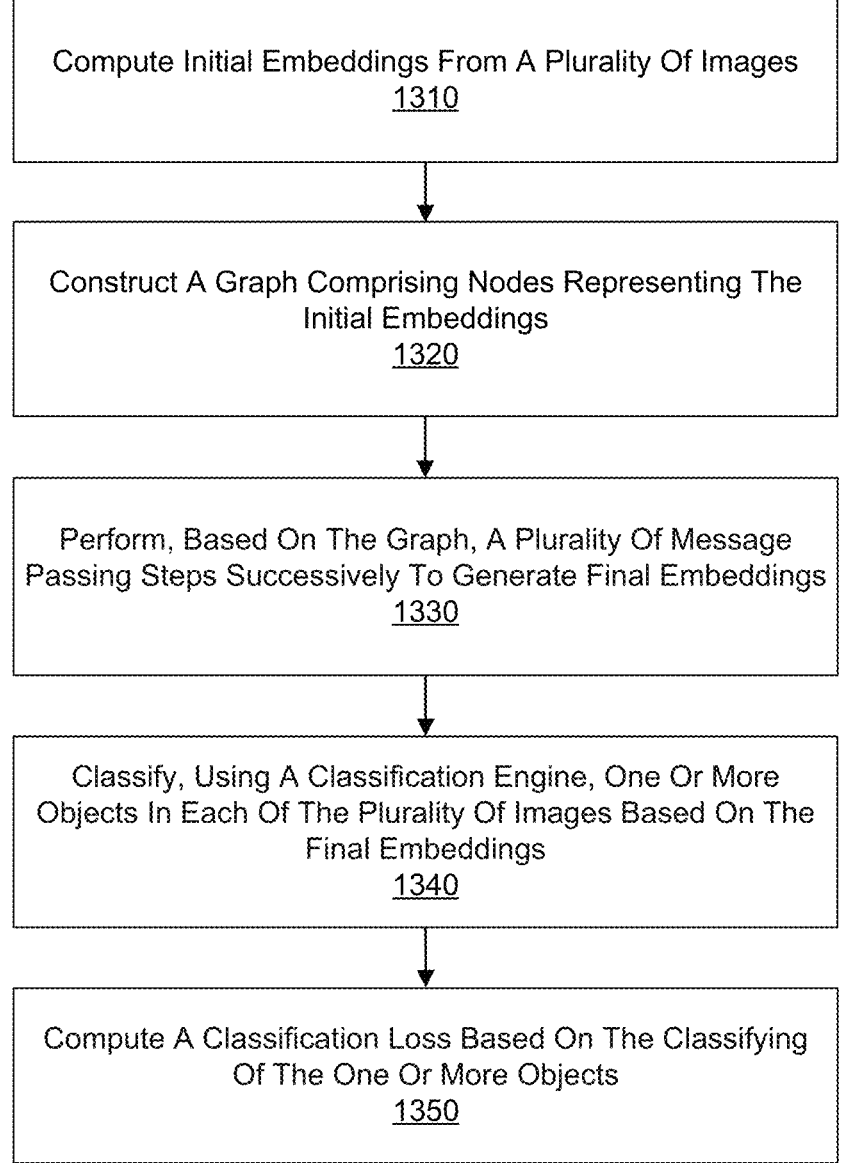

Compute Initial Embeddings From A Plurality Of Images
1310

Construct A Graph Comprising Nodes Representing The
Initial Embeddings
1320

Perform, Based On The Graph, A Plurality Of Message
Passing Steps Successively To Generate Final Embeddings
1330

Classify, Using A Classification Engine, One Or More
Objects In Each Of The Plurality Of Images Based On The
Final Embeddings
1340

Compute A Classification Loss Based On The Classifying
Of The One Or More Objects
1350

FIG. 13

MESSAGE PASSING NETWORK BASED OBJECT SIGNATURE FOR OBJECT TRACKING

PRIORITY CLAIM

This application claims the benefit of U.S. Provisional Application No. 63/478,636, filed on Jan. 5, 2023, which is hereby incorporated by reference, in its entirety and for all purposes.

TECHNICAL FIELD

The present disclosure generally relates to object tracking. For example, aspects of the present disclosure are related to message passing network based object signatures for object tracking.

BACKGROUND

Object tracking is important function of various devices and systems. For example, vehicles (e.g., autonomous vehicles, semi-autonomous vehicles, etc.) can track other vehicles across multiple cameras, over a reasonably long time, sometimes in environments with heavy occlusion (e.g., heavy traffic scenarios). Such factors associated with vehicle tracking can make vehicle tracking difficult (e.g., in the larger autonomous driving perspective). Object tracking (e.g., vehicle tracking) oftentimes relies on a rule-based identification and association of objects (e.g., vehicles) across cameras and frames.

The advent of deep learning has improved object tracking, such as based on the introduction of paradigm shifting algorithms using deep convolutional neural networks (CNNs), transformer-based architectures, etc. For example, such deep learning systems can attempt to generate a unique signature for all the objects an autonomous vehicle has observed. These signatures can then be used to track the objects (e.g., specific vehicles). In practice, however, it suffices to have a system where all instances of an object have close signatures. Most current methods still use naive methods to maintain the robustness and invariance to the factors mentioned above, heavily relying on data availability and model capacity for the same. As such, an improved, efficient solution for object tracking (e.g., vehicle tracking) is needed to address these current challenges.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Systems and techniques are described for vehicle tracking. According to at least one illustrative example, a processor-implemented method of processing image data is provided. The method includes: computing initial embeddings from a plurality of images; constructing a graph comprising nodes representing the initial embeddings; performing, based on the graph, a plurality of message passing steps successively to generate final embeddings; classifying, using a classification engine, one or more objects in each of the plurality of images based on the final embeddings; and computing a classification loss based on the classifying of the one or more objects.

In another illustrative example, an apparatus for processing image data is provided that includes at least one memory and at least one processor (e.g., configured in circuitry) coupled to the at least one memory. The at least one processor is configured to: compute initial embeddings from a plurality of images; construct a graph comprising nodes representing the initial embeddings; perform, based on the graph, a plurality of message passing steps successively to generate final embeddings; classify, using a classification engine, one or more objects in each of the plurality of images based on the final embeddings; and compute a classification loss based on the classifying of the one or more objects.

In another illustrative example, a non-transitory computer-readable medium is provided that has stored thereon instructions that, when executed by one or more processors, cause the one or more processors to: compute initial embeddings from a plurality of images; construct a fully-connected graph comprising nodes representing the initial embeddings; perform, based on the graph, a plurality of message passing steps successively to generate final embeddings; classify, using a classification engine, one or more objects in each of the plurality of images based on the final embeddings; and compute a classification loss based on the classifying of the one or more objects.

In another illustrative example, an apparatus for processing image data is provided. The apparatus includes: means for computing initial embeddings from a plurality of images; means for constructing a graph comprising nodes representing the initial embeddings; means for performing, based on the fully-connected graph, a plurality of message passing steps successively to generate final embeddings; means for classifying one or more objects in each of the plurality of images based on the final embeddings; and means for computing a classification loss based on the classifying of the one or more objects.

In some aspects, one or more of the apparatuses described herein can be, or can be part of, a camera (e.g., an Internet Protocol (IP) camera), a mobile device (e.g., a mobile telephone or so-called "smartphone," or other mobile device), a smart wearable device, an extended reality device (e.g., a virtual reality (VR) device, an augmented reality (AR) device, or a mixed reality (MR) device), a personal computer, a laptop computer, a server computer, a three-dimensional (3D) scanner, a multi-camera system, or other device. In some aspects, the apparatus(es) includes a camera or multiple cameras for capturing one or more images. In some aspects, the apparatus(es) further includes a display for displaying one or more images, notifications, and/or other displayable data. In some aspects, the apparatus(es) described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following drawing figures:

FIG. 11 is a diagram illustrating examples of different loss functions for optimization, in accordance with some examples of the present disclosure;

FIG. 13 is a flowchart illustrating an example of a process for vehicle tracking using message passing network based object signatures, in accordance with some examples of the present disclosure.

DETAILED DESCRIPTION

Figure 1:
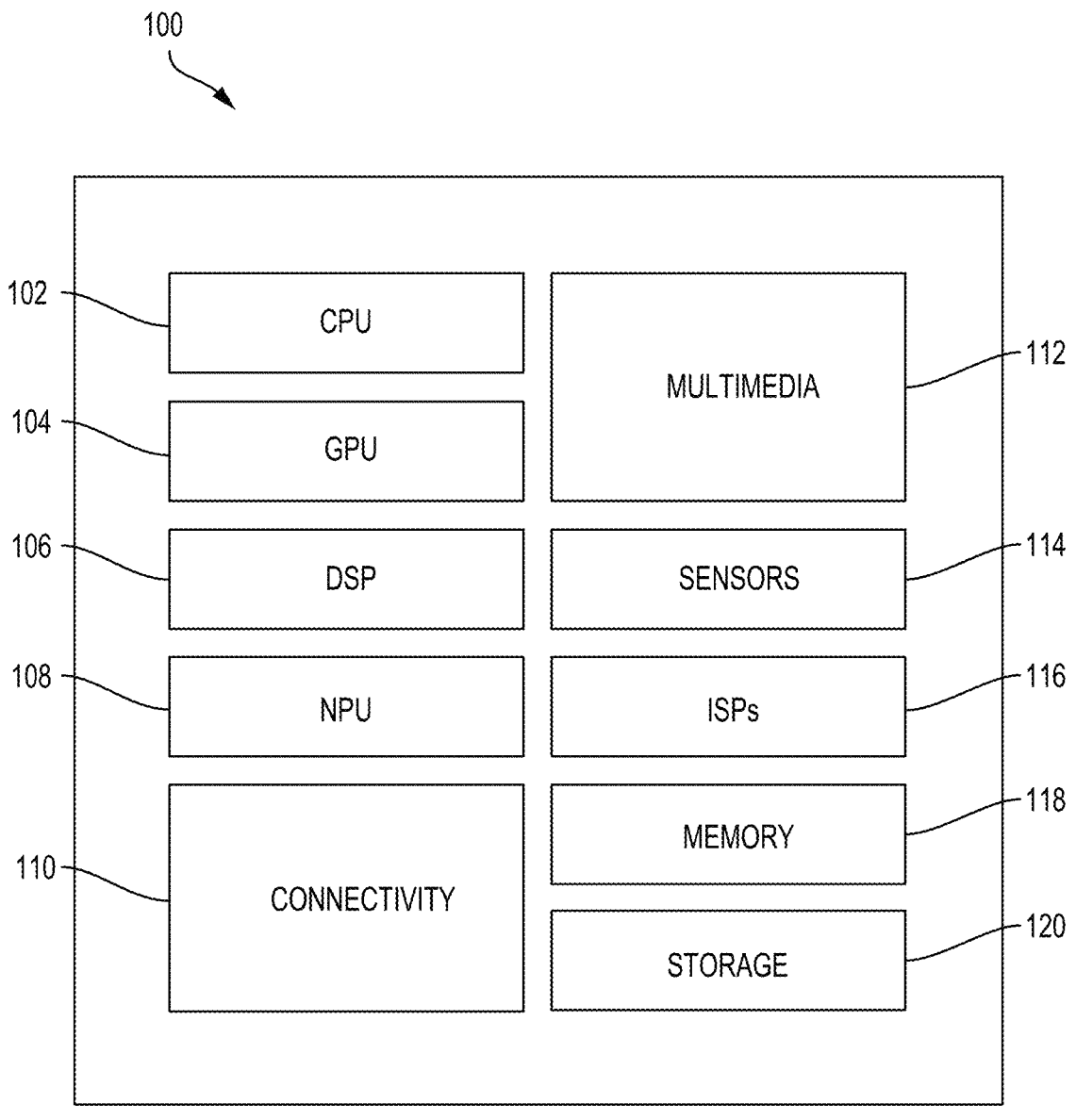
FIG. 1 is a diagram illustrating an example of an image processing system, in accordance with some examples of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

As noted above, object tracking can be used by a system to track one or objects in proximity to the system. For example, vehicles (e.g., autonomous or semi-autonomous vehicles) generally need to track objects (e.g., other vehicles, etc.) across multiple cameras, over reasonably long periods of time, sometimes in conditions with heavy occlusion from objects (e.g., heavy traffic scenarios). Some tracking systems, including vehicle tracking systems, rely on a rule-based identification and association of vehicles across cameras and frames.

Machine learning systems can be used to track vehicles. Machine learning (ML) is a subset of artificial intelligence (AI). ML systems include algorithms and statistical models that computer systems can use to perform various tasks by relying on patterns and inference, without the use of explicit instructions. One example of a ML system is a neural network (also referred to as an artificial neural network), which may be composed of an interconnected group of artificial neurons (e.g., neuron models). Neural networks may be used for various applications and/or devices, such as image analysis and/or computer vision applications, IP cameras, Internet of Things (IOT) devices, autonomous vehicles, service robots, among others.

Individual nodes in the neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as an activation map or feature map). The weight values may initially be determined by an iterative flow of training data through the network (e.g., weight values are established during a training phase in which the network learns how to identify particular classes by their typical input data characteristics).

Different types of neural networks and training mechanisms exist, such as deep generative neural network models (e.g., generative adversarial network (GANs)), recurrent neural network (RNN) models, variational autoencoders (VAEs), multilayer perceptron (MLP) neural network models, convolutional neural network (CNN) models, autoencoders (AEs), among others. For example, a GAN is a form of a generative neural network that can learn patterns in input data such that the neural network model can generate new synthetic outputs that reasonably could have been from the original dataset. A GAN can include two neural networks that operate together, including a generative neural network (or generator) and a discriminative neural network (or discriminator).

RNNs work on the principle of saving the output of a layer and feeding this output back to the input to help in predicting an outcome of the layer. In MLP neural networks, data may be fed into an input layer, and one or more hidden layers provide levels of abstraction to the data. Predictions may then be made on an output layer based on the abstracted data. MLPs may be particularly suitable for classification prediction problems where inputs are assigned a class or label. Convolutional neural networks (CNNs) are a type of feed-forward artificial neural network. CNNs may include collections of artificial neurons that each have a receptive field (e.g., a spatially localized region of an input space) and that collectively tile an input space. CNNs have numerous applications, including pattern recognition and classification.

In layered neural network architectures (referred to as deep neural networks when multiple hidden layers are present), the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

The advent of deep learning has enhanced tracking systems, including vehicle tracking systems. These deep learning-based techniques attempt to generate a unique signature for all objects (e.g., vehicles, road signs, pedestrians, lanes on a road, etc.) that a vehicle has observed. These signatures can then be used to track the objects. Such systems should be able to produce close signatures for common instances of an object. Most deep learning-based object tracking techniques use naive methods to maintain robustness and invariance to the factors noted above (e.g., tracking vehicles across multiple cameras over long periods of time in heavy occlusion conditions), heavily relying on data availability and model capacity for the same.

Systems, apparatuses, processes (also referred to as methods), and computer-readable media (collectively referred to herein as "systems and techniques") are described herein for performing object tracking employing message passing network based object signatures. The object tracking can be performed by any type of system, such as a vehicle system (e.g., of an autonomous or semi-autonomous vehicle), a robotics system, and/or an extended reality (XR) system, which may be configured to generate virtual reality (VR) content, augmented reality (AR) content, and/or mixed reality (MR) content. The systems and techniques can improve metric learning to provide an efficient solution to address current challenges in object tracking (e.g., vehicle tracking). For instance, the challenge of generating different object signatures for a common object (e.g., for a specific vehicle) by typical deep learning machine learning model can be addressed by weighing the signatures such that a fused composite object signature is obtained, where the signatures of the same object (e.g., the same vehicle) are constrained to be as close as possible using an additional message passing network.

For example, metric learning setups can be used to create object signatures using message passing networks. A message passing network is a graph with each baseline object signature (e.g., an embedding) modeled as a node, and similarity between embeddings can be used as edge weights. A fully-connected undirected graph can be created by the message passing network, which can generate final embeddings. For example, all object signatures (e.g., baseline embeddings) from the baseline model may be modified and fused by using a weighted average of the baseline embeddings to create intermediate embeddings. In addition to the edge weights of the undirected graph, an additional multiplicative factor can be used to generate final embeddings based on the intermediate embeddings. For instance, the additional multiplicative factor can be calculated using multi-headed attention between all the intermediate embeddings to generate the final embeddings (e.g., multi-headed embeddings) for the inputs (e.g., for all of the inputs). A lightweight baseline model may be employed that, when combined with a modified message passing network, can improve vehicle tracking results without compromising on computation and runtime performance.

The addition of multi-headed embeddings can provide a number of advantages. For example, one advantage is that multiplicative factors can be generated by considering local sub-parts of embeddings. This consideration can result in producing more robust embeddings with equal importance to local and global representations. Such fusion results in more robust object signatures that enable the use of additional supervision during training of the entire deep network by adding a classification loss function in addition to a representative learning loss during the training of the model. Traditionally, classification losses are added to baseline embeddings, where the contribution of the classification losses can harm the network training in later stages.

Another advantage is that the additional supervision during training can backpropagate through the entire network, which can lead to the generation of more robust embeddings even at the baseline output of the baseline model during deployment of the model. The addition of a message passing network during training helps to obtain more robust embeddings at the deployment stage without the need of any additional computing power. This feature, in addition to using a lightweight baseline model, provides more robust object signatures than simple naive models, which are currently employed for vehicle tracking.

An additional advantage is the use of message passing networks across sensor modalities, which are not implemented in current vehicle tracking systems. With baseline embeddings obtained from different sensor modalities (e.g., cameras, radars, etc.), once the baseline embeddings are generated, the message passing network can provide an efficient method to fuse object signatures from different modalities and create a sensor-agnostic object embedding, resulting in a robust vehicle tracking solution.

The one or more machine learning systems described herein can be trained and used to perform vehicle tracking using data, such as image and/or video data. The machine learning systems can be trained using vehicle tracking techniques that provide for a robust vehicle tracking solution. The systems and techniques can perform vehicle tracking using any type of data. For example, in some cases, the systems and techniques can perform vehicle tracking using image data. As another example, in some cases, the systems and techniques described herein can perform vehicle tracking using video data (e.g., a frame of video data). As used herein, the term "image" and "frame" are used interchangeably, referring to a standalone image or frame (e.g., a photograph) or a group or sequence of images or frames (e.g., making up a video or other sequence of images/frames). For simplicity, illustration and explanation purposes, the systems and techniques described herein are discussed with reference to vehicle tracking of image data (e.g., images or frames, videos, etc.). However, as noted above, the concepts described herein can also apply to other modalities such as video data and any other type of data.

Additional background and aspects related to the systems and techniques will be described with respect to the figures.

FIG. 1 is a diagram illustrating an example of an image processing system 100 in accordance with some examples of the present disclosure. In some cases, the image processing system 100 can include a central processing unit (CPU) 102, or a multi-core CPU, configured to perform one or more of the functions described herein. Variables (e.g., neural signals and synaptic weights), system parameters associated with a computational device (e.g., a neural network with weights), delays, frequency bin information, task information, among other information, may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or distributed across multiple blocks. Instructions executed at the CPU 102 may be loaded from a program memory associated with the CPU 102 and/or the memory block 118.

The image processing system 100 may include additional processing blocks tailored to specific functions, such as a GPU 104; a DSP 106; a connectivity block 110 which may include fifth generation (5G) connectivity, fourth generation long term evolution (4G LTE) connectivity, Wi-Fi connectivity, USB connectivity, Bluetooth connectivity, and the like; and/or a multimedia processor 112 that may, for example, detect and recognize features. In one implementation, the NPU 108 is implemented in the CPU 102, DSP 106, and/or GPU 104. The image processing system 100 may also include a sensor processor 114, one or more image signal processors (ISPs) 116, and/or a storage 120. In some examples, the image processing system 100 may be based on an advanced reduced instruction set computer machine (ARM) instruction set.

The image processing system 100 can be part of a computing device or multiple computing devices. In some examples, the image processing system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, an XR device (e.g., a head-mounted display, etc.), a smart wearable device (e.g., a smart watch, smart glasses, etc.), a laptop or notebook computer, a tablet computer, a set-top box, a television, a display device, a digital media player, a gaming console, a video streaming device, a drone, a computer in a car, a system-on-chip (SOC), an Internet-of-Things (IOT) device, or any other suitable electronic device(s).

While the image processing system 100 is shown to include certain components, one of ordinary skill will appreciate that the image processing system 100 can include more or fewer components than those shown in FIG. 1. For example, the image processing system 100 can also include, in some instances, one or more memory devices (e.g., RAM, ROM, cache, and/or the like), one or more networking interfaces (e.g., wired and/or wireless communications interfaces and the like), one or more display devices, and/or other hardware or processing devices that are not shown in FIG. 1. An illustrative example of a computing device and hardware components that can be implemented with the image processing system 100 is described below with respect to FIG. 14.

The image processing system 100 and/or components thereof can be configured to perform vehicle tracking using the machine learning systems and techniques described herein. In some examples, the machine learning systems can utilize deep learning neural network architectures to perform vehicle tracking using image and/or video data. As used herein, an image can refer to a still image and/or a video frame associated with a sequence of frames (e.g., a video).

As noted above, a neural network is an example of a machine learning system. A neural network can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2:
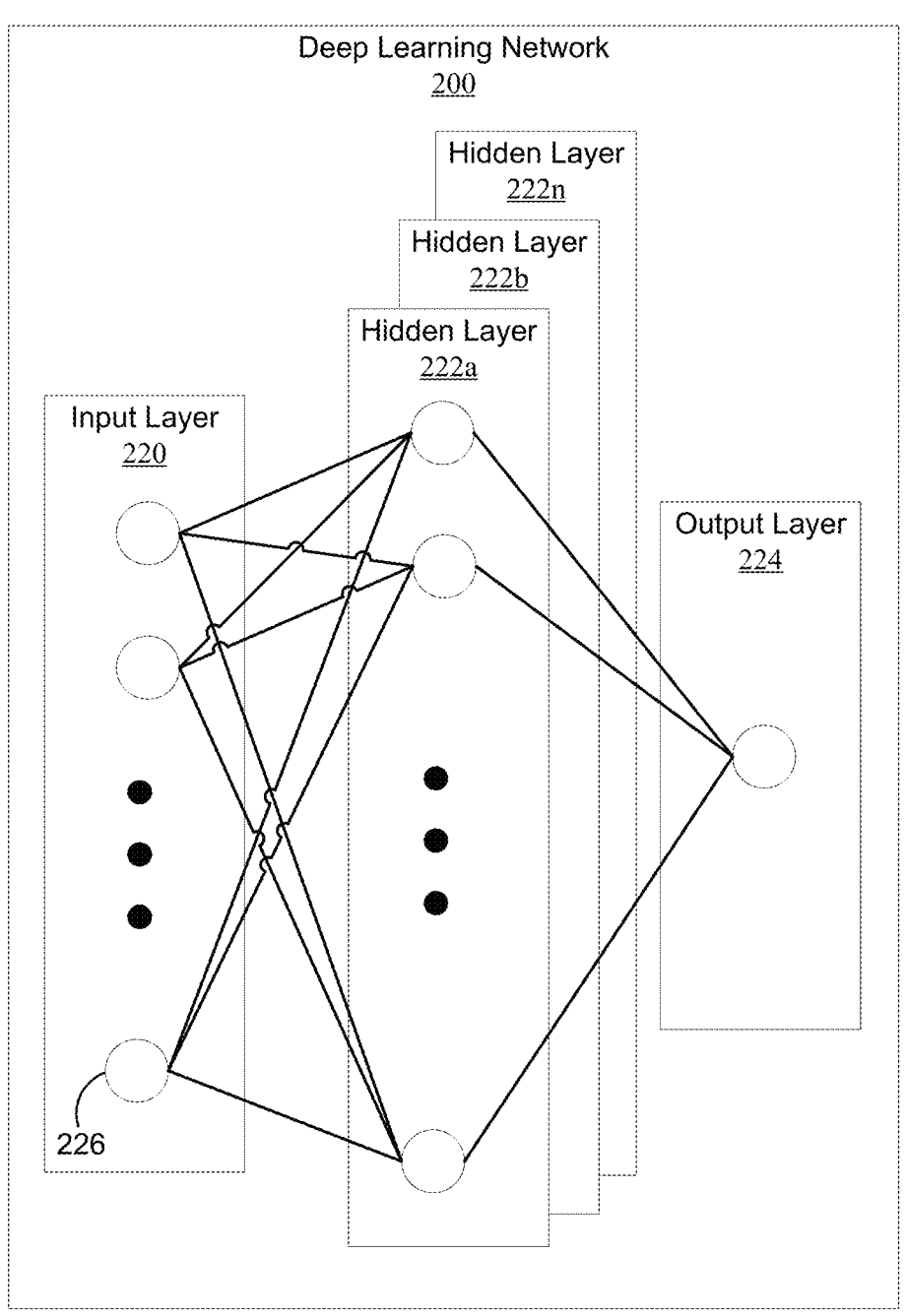
FIG. 2 is a diagram illustrating an example of a deep learning network, in accordance with some examples of the present disclosure.

FIG. 2 shows an example of a neural network, in particular a deep learning neural network. In particular, FIG. 2 is an illustrative example of a deep learning neural network 200 that can be used by a model training system. An input layer

220 includes input data. In one illustrative example, the input layer 220 can include data representing the pixels of an input image or video frame. The neural network 200 includes multiple hidden layers 222a, 222b, through 222n. The hidden layers 222a, 222b, through 222n include "n" number of hidden layers, where "n" is an integer greater than or equal to one. The number of hidden layers can be made to include as many layers as needed for the given application. The neural network 200 further includes an output layer 224 that provides an output resulting from the processing performed by the hidden layers 222a, 222b, through 222n. In one illustrative example, the output layer 224 can provide a classification for an object in an input image or video frame. The classification can include a class identifying the type of object (e.g., a vehicle, an automobile, a person, a dog, a cat, or other object).

The neural network 200 is a multi-layer neural network of interconnected nodes. Each node can represent a piece of information. Information associated with the nodes is shared among the different layers and each layer retains information as information is processed. In some cases, the neural network 200 can include a feed-forward network, in which case there are no feedback connections where outputs of the network are fed back into itself. In some cases, the neural network 200 can include a recurrent neural network, which can have loops that allow information to be carried across nodes while reading in input.

Information can be exchanged between nodes through node-to-node interconnections between the various layers. Nodes of the input layer 220 can activate a set of nodes in the first hidden layer 222a. For example, as shown, each of the input nodes of the input layer 220 is connected to each of the nodes of the first hidden layer 222a. The nodes of the hidden layers 222a, 222b, through 222n can transform the information of each input node by applying activation functions to the information. The information derived from the transformation can then be passed to and can activate the nodes of the next hidden layer 222b, which can perform their own designated functions. Example functions include convolutional, up-sampling, data transformation, and/or any other suitable functions. The output of the hidden layer 222b can then activate nodes of the next hidden layer, and so on. The output of the last hidden layer 222n can activate one or more nodes of the output layer 224, at which an output is provided. In some cases, while nodes (e.g., node 226) in the neural network 200 are shown as having multiple output lines, a node has a single output and all lines shown as being output from a node represent the same output value.

In some cases, each node or interconnection between nodes can have a weight that is a set of parameters derived from the training of the neural network 200. Once the neural network 200 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 200 to be adaptive to inputs and able to learn as more and more data is processed.

The neural network 200 is pre-trained to process the features from the data in the input layer 220 using the different hidden layers 222a, 222b, through 222n in order to provide the output through the output layer 224. In an example in which the neural network 200 is used to identify objects (e.g., specific vehicles) in images, the neural network 200 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 200 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 200 is trained well enough so that the weights of the layers are accurately tuned.

For the example of identifying objects in images, the forward pass can include passing a training image through the neural network 200. The weights are initially randomized before the neural network 200 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 200, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 200 is unable to determine low level features and, thus, cannot make an accurate determination of what the classification of the object might be. A loss function can be used to analyze error in the output. Any suitable loss function definition can be used. One example of a loss function includes a mean squared error (MSE). The MSE is defined as $$E_{total} = \sum \frac{1}{2}(\text{target} - \text{output})^2,$$

which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 200 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and $\eta$ denotes a learning rate. The learning rate can be set to any suitable value, with a high learning rate including larger weight updates and a lower value indicating smaller weight updates.

Figure 3A:
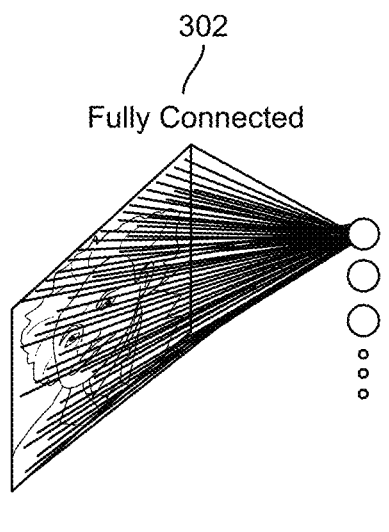
FIG. 3A is a diagram illustrating an example of a fully-connected neural network, in accordance with some examples of the present disclosure.
Figure 3B:
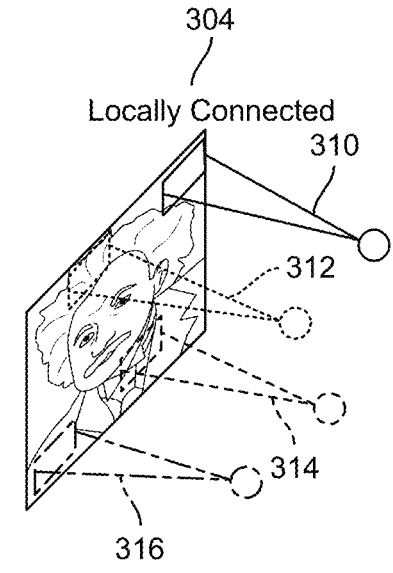
FIG. 3B is a diagram illustrating an example of a locally-connected neural network, in accordance with some examples of the present disclosure.
Figure 3C:
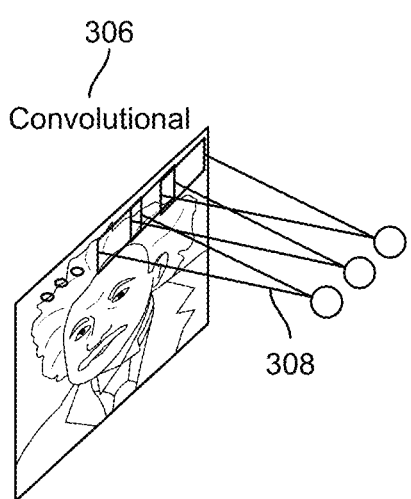
FIG. 3C is a diagram illustrating an example of a convolutional neural network, in accordance with some examples of the present disclosure.
Figure 3D:
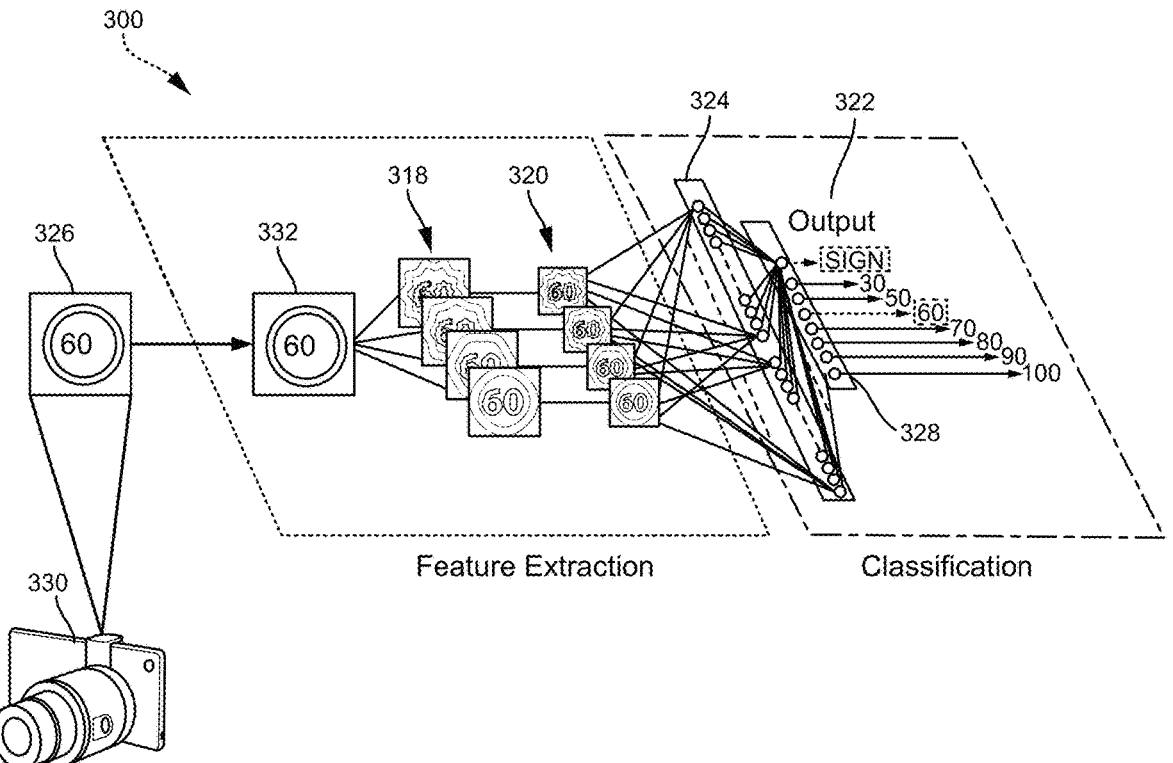
FIG. 3D is a diagram illustrating an example of a deep convolutional network (DCN) for recognizing visual features from an image, in accordance with some examples of the present disclosure.
Figure 4:
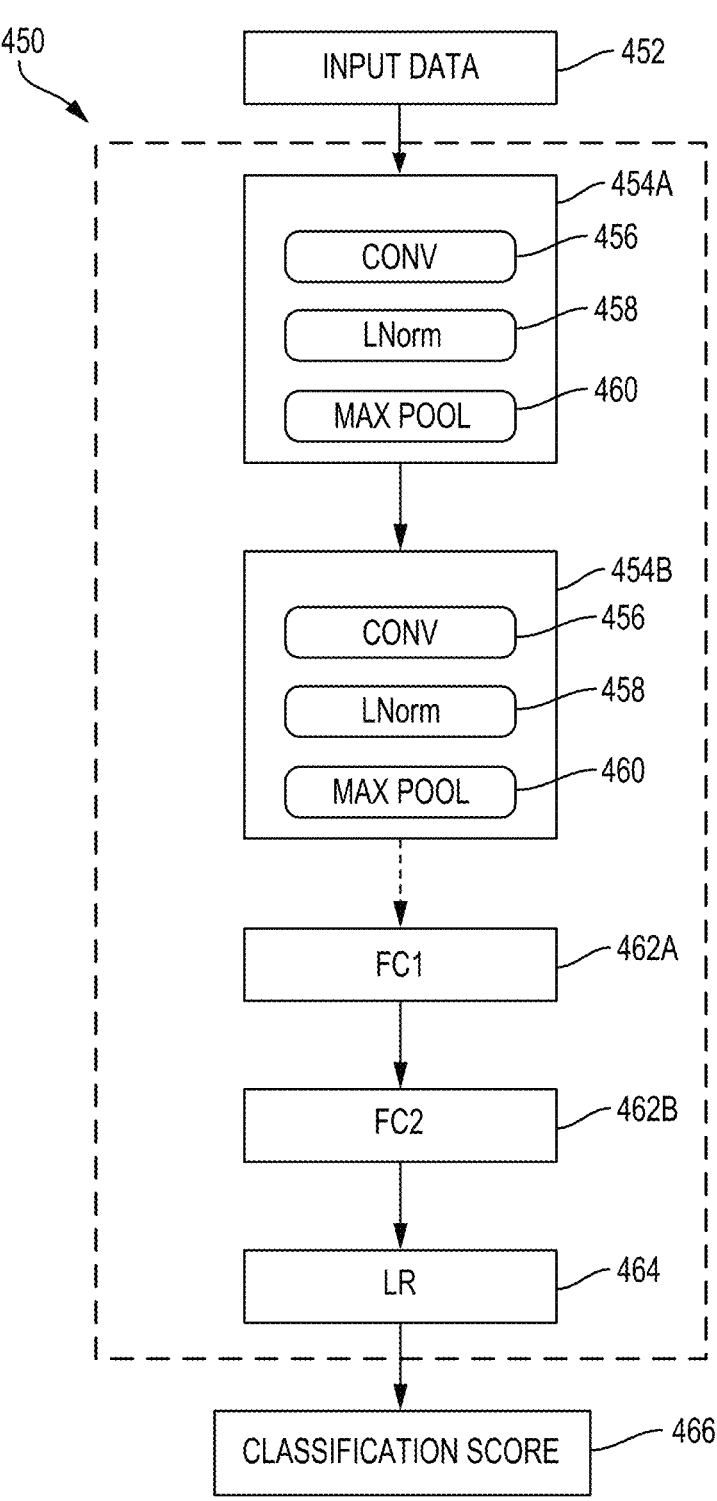
FIG. 4 is a block diagram illustrating an example deep convolutional network (DCN), in accordance with some examples of the present disclosure.

The neural network 200 can include any suitable deep network. One example includes a convolutional neural network (CNN), which includes an input layer and an output layer, with multiple hidden layers between the input and output layers. An example of a deep convolutional network (DCN), which is a type of CNN, is shown in FIGS. 3D and 4. The hidden layers of a CNN include a series of convolutional, nonlinear, pooling (for downsampling), and fully connected layers. The neural network 200 can include any other deep network other than a CNN, such as deep belief nets (DBNs), Recurrent Neural Networks (RNNs), among others.

As previously mentioned, a neural network may be designed with a variety of different connectivity patterns. For example, the connections between layers of a neural network may be fully connected or locally connected. FIG. 3A illustrates an example of a fully connected neural network 302. In a fully connected neural network 302, a neuron in a first layer may communicate its output to every neuron in a second layer such that each neuron in the second layer will receive input from every neuron in the first layer. FIG. 3B illustrates an example of a locally connected neural network 304. In a locally connected neural network 304, a neuron in a first layer may be connected to a limited number of neurons in the second layer. More generally, a locally connected layer of the locally connected neural network 304 may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

One example of a locally connected neural network is a convolutional neural network. FIG. 3C illustrates an example of a CNN 306. The convolutional neural network 306 may be configured such that the connection strengths associated with the inputs for each neuron in the second layer are shared (e.g., 308). Convolutional neural networks may be well suited to problems in which the spatial location of inputs is meaningful. Convolutional neural network 306 may be used to perform one or more aspects of vehicle tracking, according to aspects of the present disclosure.

One type of convolutional neural network is a deep convolutional network (DCN). FIG. 3D illustrates a detailed example of a DCN 300 designed to recognize visual features from an image 326 input from an image capturing device 330, such as a car-mounted camera. The DCN 300 of the current example may be trained to identify traffic signs and a number provided on the traffic sign. Of course, the DCN 300 may be trained for other tasks, such as identifying specific vehicles, lane markings, or identifying traffic lights.

The DCN 300 may be trained with supervised learning. During training, the DCN 300 may be presented with an image, such as the image 326 of a speed limit sign, and a forward pass may then be computed to produce an output 322. The DCN 300 may include a feature extraction section and a classification section. Upon receiving the image 326, a convolutional layer 332 may apply convolutional kernels (not shown) to the image 326 to generate a first set of feature maps 318. As an example, the convolutional kernel for the convolutional layer 332 may be a 5×5 kernel that generates 28×28 feature maps. In the present example, because four different feature maps are generated in the first set of feature maps 318, four different convolutional kernels were applied to the image 326 at the convolutional layer 332. The convolutional kernels may also be referred to as filters or convolutional filters.

The first set of feature maps 318 may be subsampled by a max pooling layer (not shown) to generate a second set of feature maps 320. The max pooling layer reduces the size of the first set of feature maps 318. That is, a size of the second set of feature maps 320, such as 14×14, is less than the size of the first set of feature maps 318, such as 28×28. The reduced size provides similar information to a subsequent layer while reducing memory consumption. The second set of feature maps 320 may be further convolved via one or more subsequent convolutional layers (not shown) to generate one or more subsequent sets of feature maps (not shown).

In the example of FIG. 3D, the second set of feature maps 320 is convolved to generate a first feature vector 324. Furthermore, the first feature vector 324 is further convolved to generate a second feature vector 328. Each feature of the second feature vector 328 may include a number that corresponds to a possible feature of the image 326, such as "sign," "60," and "100." A softmax function (not shown) may convert the numbers in the second feature vector 328 to a probability. As such, an output 322 of the DCN 300 is a probability of the image 326 including one or more features.

In the present example, the probabilities in the output 322 for "sign" and "60" are higher than the probabilities of the others of the output 322, such as "30," "40," "50," "70," "80," "90," and "100". Before training, the output 322 produced by the DCN 300 is likely to be incorrect. Thus, an error may be calculated between the output 322 and a target output. The target output is the ground truth of the image 326 (e.g., "sign" and "60"). The weights of the DCN 300 may then be adjusted so the output 322 of the DCN 300 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 322 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing the color information. The outputs of the convolutional connections may be considered to form a feature map in the subsequent layer, with each element of the feature map (e.g., 320) receiving input from a range of neurons in the previous layer (e.g., feature maps 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

FIG. 4 is a block diagram illustrating an example of a deep convolutional network 450. The deep convolutional network 450 may include multiple different types of layers based on connectivity and weight sharing. As shown in FIG. 4, the deep convolutional network 450 includes the convolution blocks 454A, 454B. Each of the convolution blocks 454A, 454B may be configured with a convolution layer (CONV) 456, a normalization layer (LNorm) 458, and a max pooling layer (MAX POOL) 460.

The convolution layers 456 may include one or more convolutional filters, which may be applied to input data 452 (e.g., including images, audio, video, sensor data, and/or other input data) to generate a feature map. Although only two convolution blocks 454A, 454B are shown, the present disclosure is not so limiting, and instead, any number of convolution blocks (e.g., blocks 454A, 454B) may be included in the deep convolutional network 450 according to design preference. The normalization layer 458 may normalize the output of the convolution filters. For example, the normalization layer 458 may provide whitening or lateral inhibition. The max pooling layer 460 may provide down sampling aggregation over space for local invariance and dimensionality reduction.

The parallel filter banks, for example, of a deep convolutional network may be loaded on a CPU 102 or GPU 104 of an image processing system 100 to achieve high performance and low power consumption. In alternative aspects, the parallel filter banks may be loaded on the DSP 106 or an ISP 116 of an image processing system 100. In addition, the deep convolutional network 450 may access other processing blocks that may be present on the image processing system 100, such as sensor processor 114.

The deep convolutional network 450 may also include one or more fully connected layers, such as layer 462A (labeled "FC1") and layer 462B (labeled "FC2"). The deep convolutional network 450 may further include a logistic regression (LR) layer 464. Between each layer 456, 458, 460, 462A, 462B, 464 of the deep convolutional network 450 are weights (not shown) that are to be updated. The output of each of the layers (e.g., 456, 458, 460, 462A, 462B, 464) may serve as an input of a succeeding one of the layers (e.g., 456, 458, 460, 462A, 462B, 464) in the deep convolutional network 450 to learn hierarchical feature representations from the input data 452 (e.g., images, audio, video, sensor data, and/or other input data) supplied at the first of the convolution blocks 454A. The output of the deep convolutional network 450 is a classification score 466 for the input data 452. The classification score 466 may be a set of probabilities, where each probability is the probability of the input data including a feature from a set of features.

Figure 5:
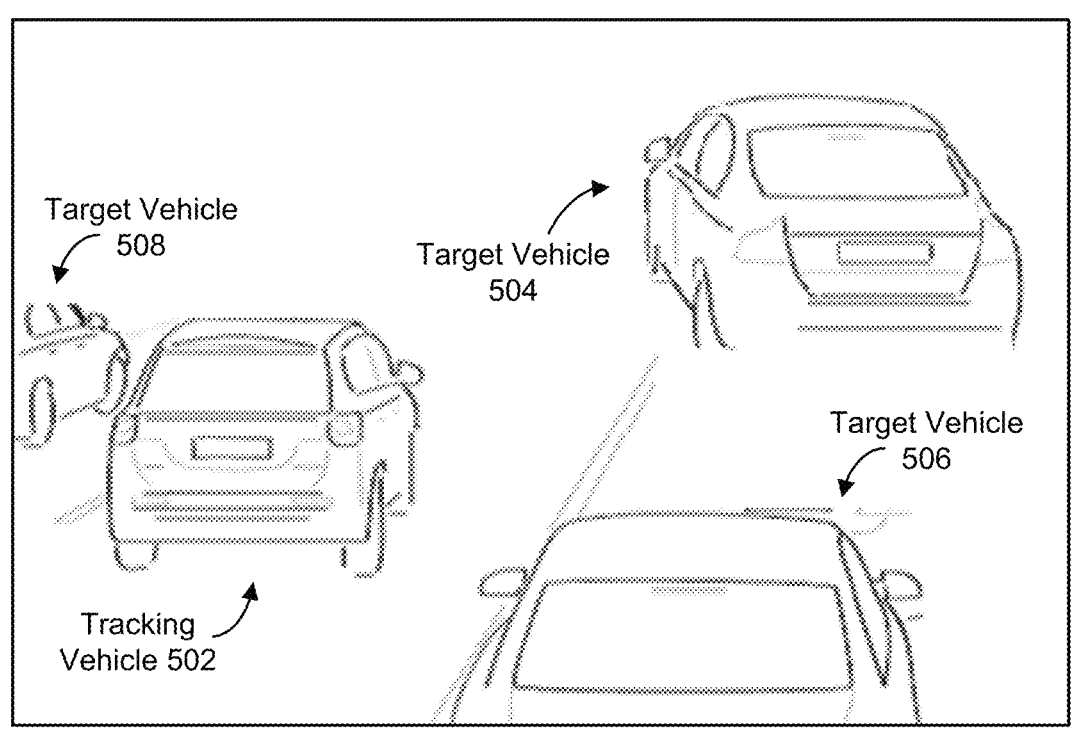
FIG. 5 is an image illustrating an example of multiple vehicles driving on a road, in accordance with some examples of the present disclosure.

FIG. 5 is an image 500 illustrating an example environment including numerous vehicles (e.g., automobiles) driving on a road. The vehicles include a tracking vehicle 502, a target vehicle 504, a target vehicle 506, and a target vehicle 508. The tracking vehicle 502 is an autonomous vehicle operating at a particular autonomy level. The tracking vehicle 502 can track the target vehicles 504, 506, and 508 in order to navigate the environment. For example, the tracking vehicle 502 can track each of the specific target vehicles 504, 506, and 508 as they are driving on the road. While the vehicle 502 is referred to as a tracking vehicle 502 and the vehicles 504, 506, and 508 are referred to as target vehicles with respect to FIG. 5, the vehicles 504, 506, and 508 can also be referred to as tracking vehicles if and when they are tracking other vehicles, in which the other vehicles become target vehicles.

During operation of vehicle tracking by the tracking vehicle 502, multiple sensors (e.g., cameras) mounted at various different locations on the tracking vehicle 502 (e.g., autonomous vehicle) may obtain images (e.g., across multiple field of views) of the target vehicles 504, 506, 508. The tracking vehicle 502 (e.g., at least one processor of the tracking vehicle 502) may perform data association using the obtained images. For data association, for each new sensor frame (e.g., new image), the detection of each of the target vehicles 504, 506, 508 within the sensor frame can be associated with a respective track. For example, target vehicle 504 may be associated with a first track (e.g., track 1), target vehicle 506 may be associated with a second track (e.g., track 2), and target vehicle 508 may be associated with a third track (e.g., track 3).

Traditionally, camera-track and camera-camera associators are based on geometry only and, as such, can be sensitive to estimation errors. In cases of high sudden movement, for example when a new vehicle (e.g., automobile or motorcycle) abruptly cuts into (e.g., swerves into) the sensor frame, geometry alone may not always allow for accurate data association. Since camera sensors have a lack of depth, data association across multiple cameras can be difficult to achieve with accuracy.

Since a tracking vehicle (e.g., tracking vehicle 502 of FIG. 5, 600 of FIG. 6) may have sensors (e.g., cameras) mounted at various different locations on itself, the different sensors can each have a different field of view (FOV). Since the different sensors have different FOVs, the sensors may obtain images of an object (e.g., a target vehicle) from different perspectives.

Figure 6:
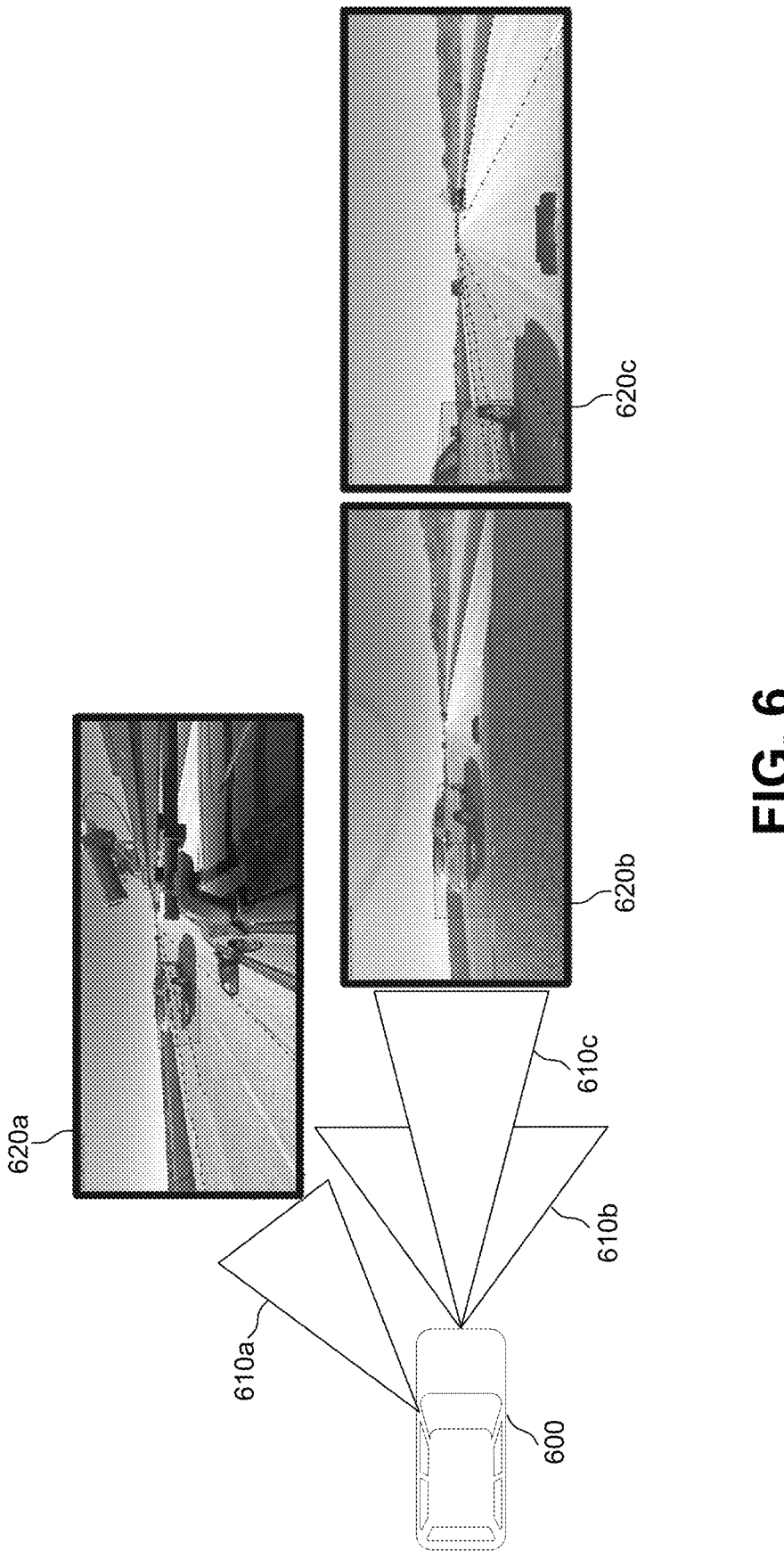
FIG. 6 is a diagram illustrating an example of a vehicle (e.g., an autonomous vehicle) viewing a particular vehicle using different cameras, in accordance with some examples of the present disclosure.

FIG. 6 shows images 620a, 620b, 620c each showing different a perspective of a target vehicle. In particular, FIG. 6 is a diagram illustrating an example of a tracking vehicle 600 (e.g., an autonomous vehicle) viewing a particular target vehicle using different cameras. Each of the different cameras has a different FOV 610a, 610b, 610c. Since each camera has a different FOV 610a, 610b, 610c, each camera can obtain an image 620a, 620b, 620c of the target vehicle showing a different perspective.

The different perspectives can lead to a large variation in appearance of the target vehicle in the images 620a, 620b, 620c. The geometry of the different FOVs allows for the cameras to observe different aspects of the target vehicle in the images 620a, 620b, 620c. This large variation in appearance of the target vehicle can lead to difficulty in tracking the target vehicle.

Figure 7:
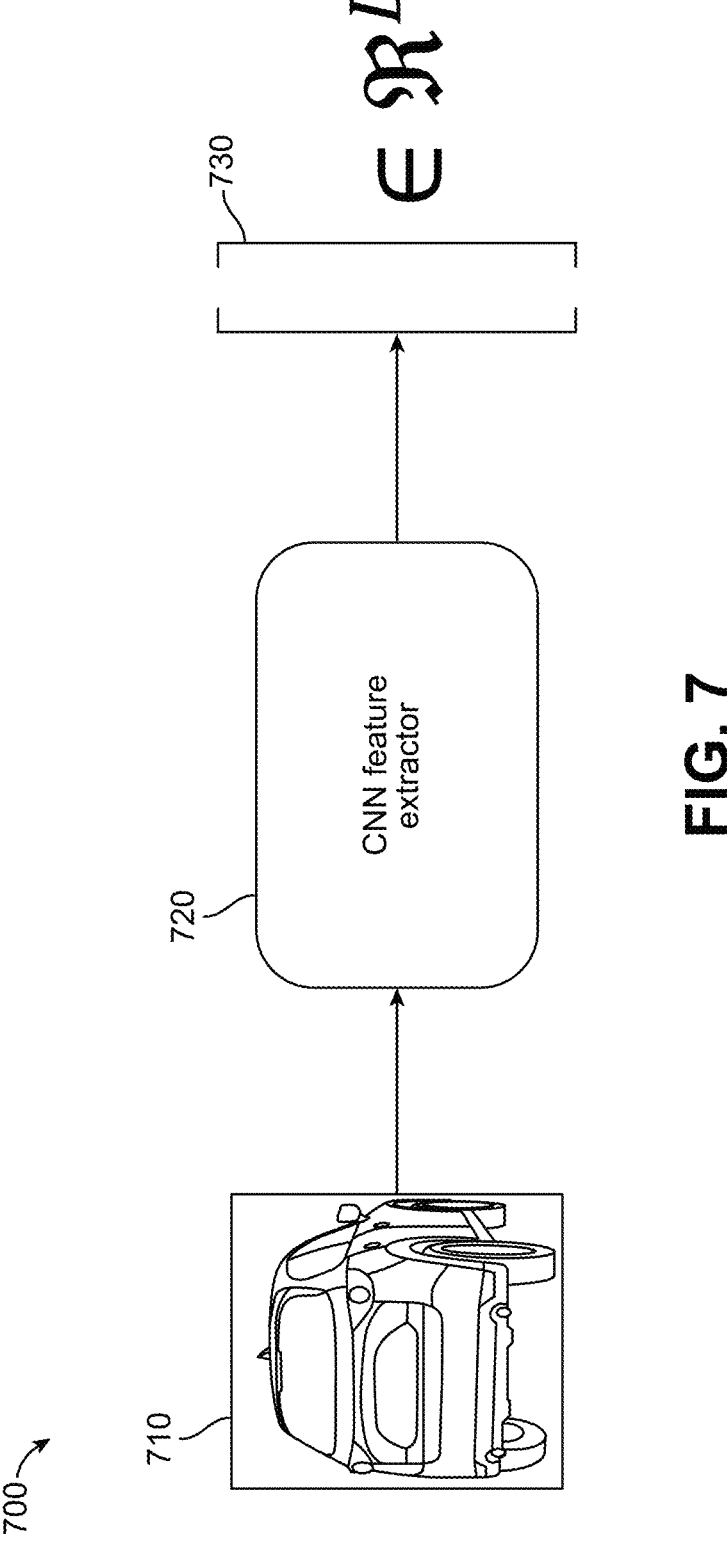
FIG. 7 is a diagram illustrating an example of a baseline model for appearance feature extraction, in accordance with some examples of the present disclosure.

FIG. 7 is a diagram illustrating an example of a baseline model 700 for appearance feature extraction (e.g., for tracking target vehicles). In FIG. 7, a plurality of images 710 (e.g., obtained from cameras of a tracking vehicle), such as a batch of images, may be input into a CNN feature extractor 720, which may be located on the tracking vehicle. The CNN feature extractor 720 may extract features (e.g., related to a target vehicle) from the batch of images 710. Each feature may be related to an identity of an object (e.g., a specific target vehicle). Each feature can be in the form of a vector 730 of dimension D of real numbers. The different dimensions may include, but are not limited to, an X coordinate of a location, Y coordination of the location, Z coordinate of the location, a speed, an orientation, and/or a color of the target vehicle.

Each of the features may be represented as an embedding within an embedding space. For an accurate data association, the features of a same vehicle (e.g., a particular target vehicle) should be close to each other within the embedding space (e.g., an inter-class similarity), and conversely, the features of different objects should be distant from one another within the embedding space (e.g., an intra-class variance).

Figure 8:
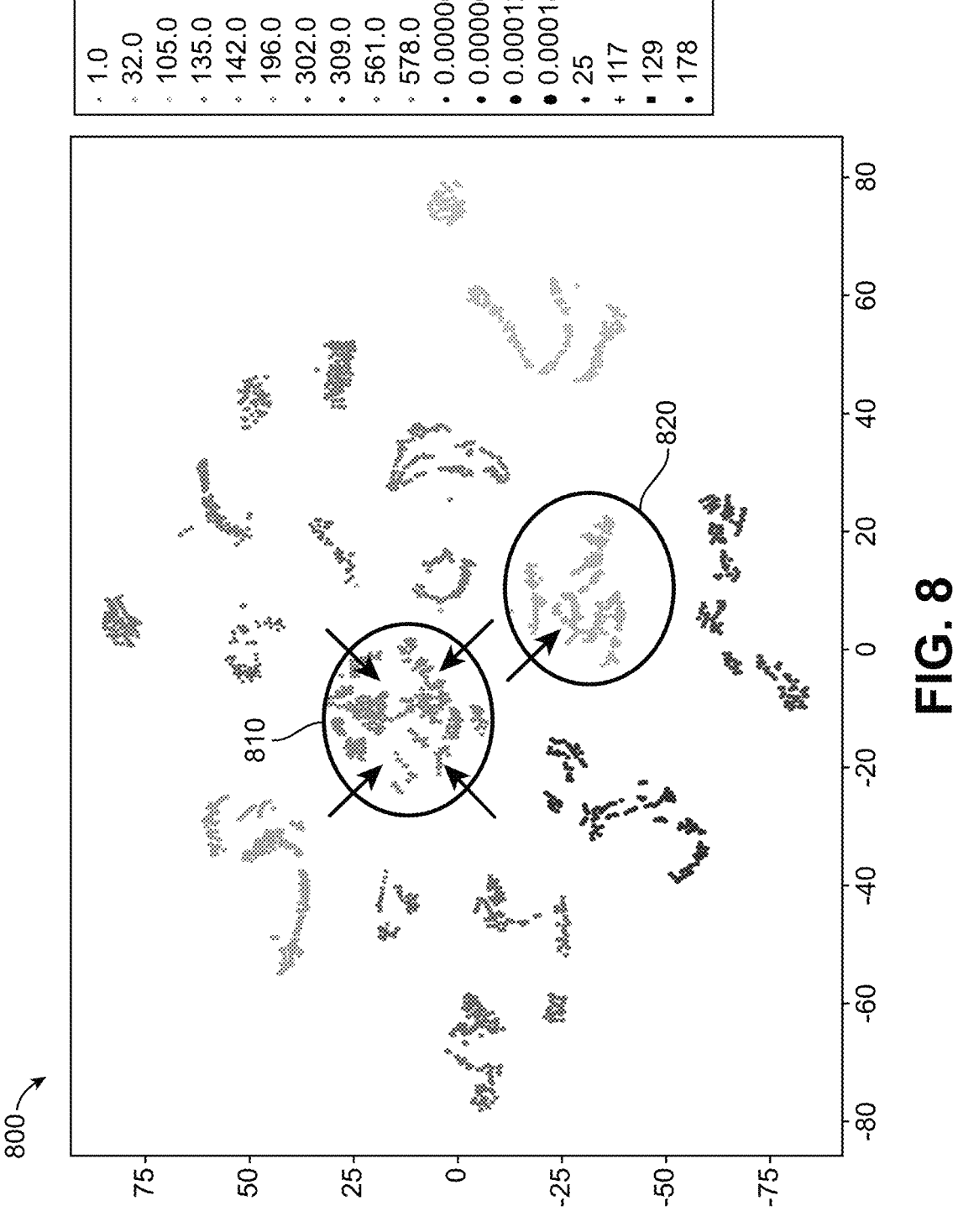
FIG. 8 is a graph illustrating an example of clusters of embeddings within an embedding space, in accordance with some examples of the present disclosure.

FIG. 8 is a graph 800 illustrating an example of clusters 810, 820 of embeddings (e.g., which represent features) within an embedding space. Each of the clusters 810, 820 of embeddings can represent a different target vehicle. For example, cluster 810 of embeddings may represent a first target vehicle (e.g., target vehicle 504 of FIG. 5), and cluster

820 of embeddings may represent a second target vehicle (e.g., target vehicle 506 of FIG. 5).

Figure 9:
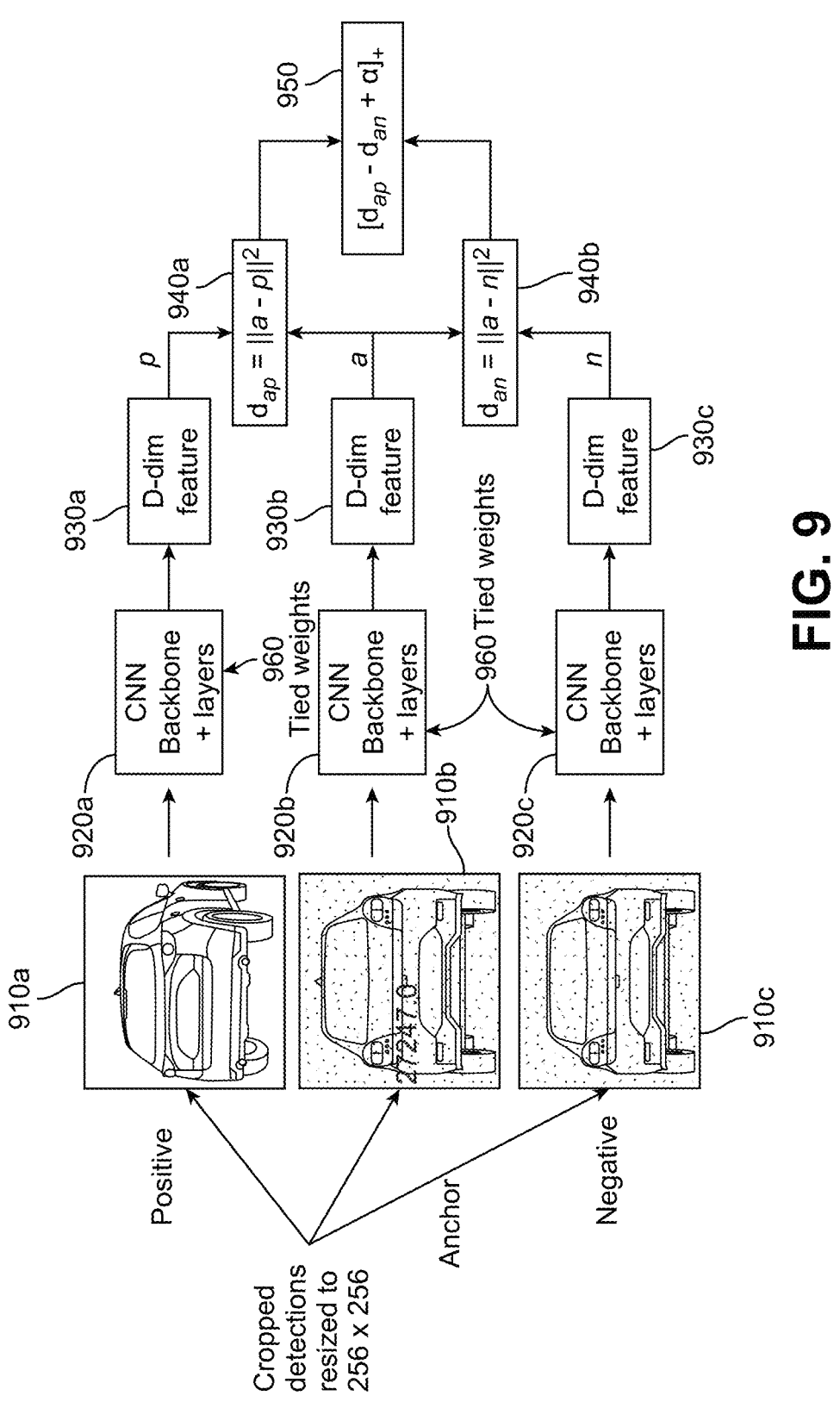
FIG. 9 is a diagram illustrating example details of the baseline model for appearance feature extraction of FIG. 7, in accordance with some examples of the present disclosure.

FIG. 9 is a diagram illustrating example details of the baseline model 700 for appearance feature extraction of FIG. 7. In FIG. 9, the batch images are shown to include an anchor image 910b, at least one positive image 910a, and at least one negative image 910c. The anchor image 910b may be chosen as the example image containing a target vehicle to be tracked. The positive image 910a is an image that is similar to the anchor image 910b. For example, the positive image 910a may contain a different view of the target vehicle contained within the anchor image 910b. The negative image 910c is an image that is different than the anchor image 910b. For example, the negative image 910c may contain a view of a different vehicle than the target vehicle contained within the anchor image 910b. These three types of images (e.g., anchor image 910b, positive image 910a, and negative image 910c) can form a triplet.

These images (e.g., anchor image 910b, positive image 910a, and negative image 910c) may be input into a CNN 920a, 920b, 920c (e.g., including a CNN backbone plus layers). The CNNs 920a, 920b, 920c may have tied weights 960 (e.g., the weights are tied meaning that the weights are the same across the CNNs 920a, 920b, 920c). The CNNs 920a, 920b, 920c can extract features 930a, 930b, 930c (e.g., D-dimensional features) from the images (e.g., anchor image 910b, positive image 910a, and negative image 910c).

A positive loss 940a (dap) (e.g., $d_{ap} = \|a-p\|^2$) may be calculated (e.g., by at least one processor of the tracking vehicle) using the features 930a, 930b of the positive image 910a and the anchor image 910b, respectively. Also, a negative loss 940b ($d_{an}$) (e.g., $d_{an} = \|a-n\|^2$) may be calculated (e.g., by at least one processor of the tracking vehicle) using the features 930b, 930c of the anchor image 910b and the negative image 910c, respectively. Then, a classification loss 950 (e.g., [dap–dan++a]+) may be calculated (e.g., by at least one processor of the tracking vehicle) by using the positive loss 940a and the negative loss 940b. The alpha (a) within the classification loss 950 formula can be an amount of separation desired between the positive loss 940a and the negative loss 940b.

After the classification loss 950 is determined, back propagation can occur where the weights of the network can be tuned or adjusted in order to obtain more accurate classification results. As such, the weights of the tied weights 960 can be adjusted for the next batch of images to be input into the CNNs 920a, 920b, 920c to have their features extracted. The tuning of the weights and the process can be repeated for a certain number of times or until a level of accuracy of the classification has been achieved.

Figure 10:
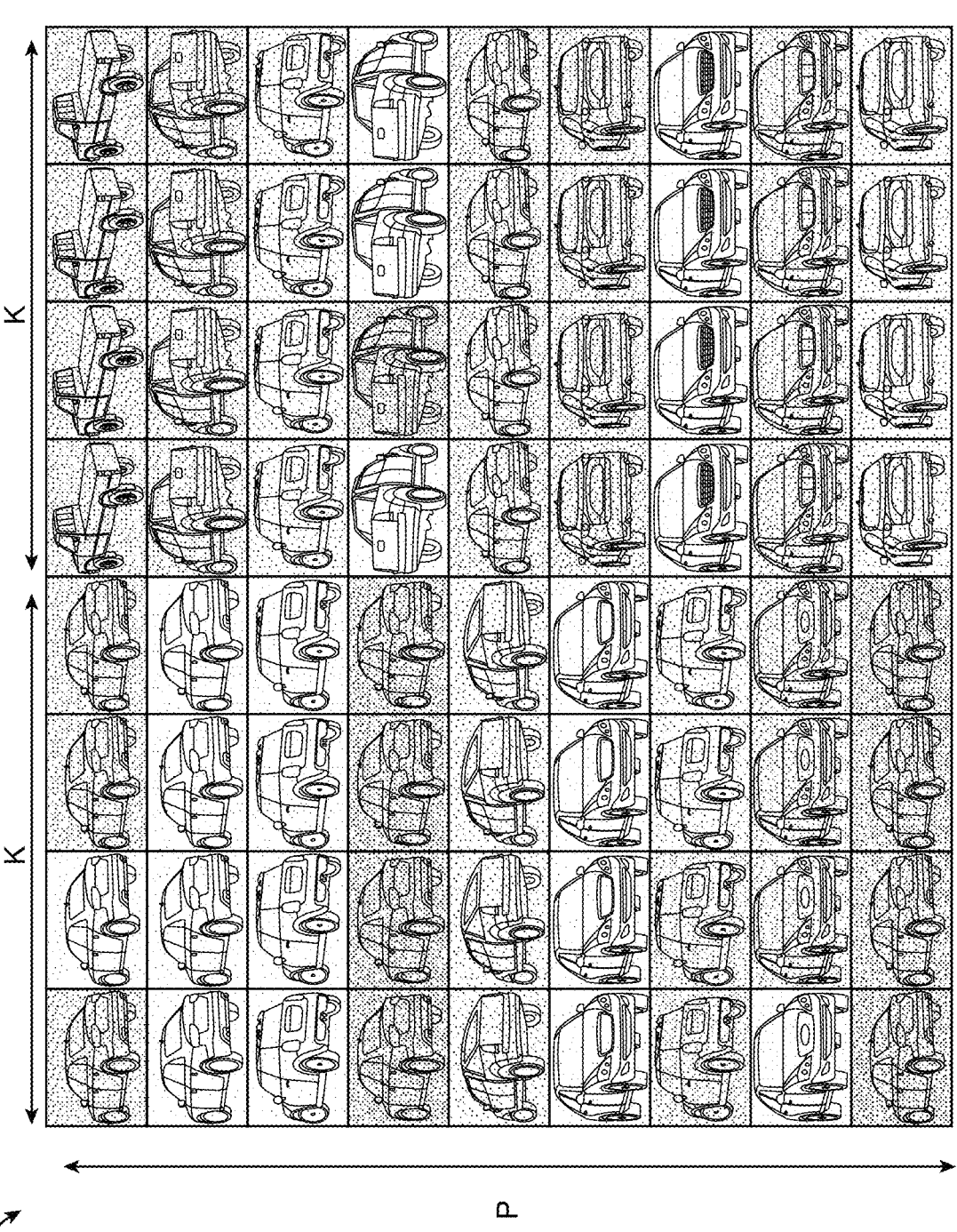
FIG. 10 is diagram illustrating an example of batch contents containing images, in accordance with some examples of the present disclosure.

FIG. 10 is diagram illustrating an example of batch contents 1000 containing n number of images (e.g., which may include at least one anchor image, at least one positive image, and/or at least one negative image). In FIG. 10, the batch contents 1000 may include K number of detections from P number of tracks. Each of the K detections may represent a different object (e.g., a different vehicle), and each of the P tracks may be from a different camera and/or a different view.

For triplet mining (e.g., for use in the baseline model 700 for appearance feature extraction) from the batch contents 1000, various different triplet selection strategies may be employed. The different triplet selection strategies that may be employed can include, but are not limited to, "batch all" and "batch hard". The "batch all" triplet mining strategy sums the triplet losses for all triplets in the batch contents 1000. For the "batch all" triplet mining strategy, the number of selected triplets can be equal to: PK(PK−1).

The "batch hard" triplet mining strategy sums the triplet losses for the hardest positive (e.g., the largest distance for positive) and hardest negative (e.g., the smallest distance for negative) images within the batch contents 1000. For the "batch hard" triplet mining strategy, the number of selected triplets can be equal to: PK.

FIG. 11 is a diagram illustrating examples of different loss functions 1100 for optimization, which may include triplet loss 1110 (e.g., a standard triplet loss) with or without a classification loss, and fast approximated triplet (FAT) loss 1120. For the triplet loss 1110, point-to-point distances are compared. For example, for the triplet loss 1110, the distances (e.g., distance 1150) between the positive samples 1130a, 1130b, 1130c (e.g., positive images) and the negative samples 1140a, 1140b, 1140c, 1140d (e.g., negative images) are compared (e.g., measured).

Conversely, for the FAT loss 1120, point-to-set distances are compared, while regularizing all clusters 1195a, 1195b to be compact. Cluster 1195a contains positive samples 1160a, 1160b, 1160c (e.g., positive images), and cluster 1195b contains negative samples 1170a, 1170b, 1170c, 1170c (e.g., negative images). For the FAT loss 1120, the distances (e.g., distance 1190) between the positive samples 1160a, 1160b, 1160c (e.g., positive images) and a centroid 1180b of the cluster 1195b of the negative samples 1170a, 1170b, 1170c, 1170c (e.g., negative images) are compared (e.g., measured). Similarly, for the FAT loss 1120, the distances between the negative samples 1170a, 1170b, 1170c, 1170d (e.g., negative images) and a centroid 1180a of the cluster 1195a of the positive samples 1160a, 1160b, 1160c (e.g., positive images) are compared (e.g., measured). For the FAT loss 1120, the computation time is:

$$L_{FAT} = \sum_{\{a,n,n \neq y_a\}} [d(a, c_a) + \alpha - d(a, c_n)]_+ \qquad \text{Equation (1)}$$

Since the FAT loss 1120 compares point-to-set distances rather than point-to-point distances, as is performed by the triplet loss 1110, the FAT loss 1120 allows for a reduction in computation time during training as compared to the triplet loss 1110. For example, for batch all mining, the FAT loss 1120 requires an order of $PK^2$ computations (e.g., $O(PK^2)$), while the triplet loss 1110 requires an order of $P^2K^2$ computations (e.g., $O(P^2K^2)$). As such, the FAT loss 1120 allows for a ten (10) times reduction in training time than triplet loss 1110. The FAT loss 1120 is more robust than the triplet loss 1110 to outlier examples (e.g., outlier images).

The baseline model 700 for appearance feature extraction has a number of disadvantages. One disadvantage of the baseline model 700 is that the baseline model 700 does not consider the problem completely of appearance feature learning through representation learning. Another disadvantage of the baseline model 700 is that it is prone to decrease in performance capacity owing to triplet loss formation. An additional disadvantage of the baseline model 700 is that heavy hyperparameter tuning is required. A further disadvantage of the baseline model 700 is that it is sensor specific, where sensor fusion can only be performed as a post-processing step.

In one or more aspects, the systems and techniques provide an improved model for vehicle tracking that utilizes message passing for training of the model. As previously mentioned, the baseline model 700 relies on losses that only take relations between triplets of samples into account (e.g., the triplet loss 1110 and the FAT loss 1120). These methods do not explore the embedding space (e.g., as shown in graph 800 of FIG. 8) in its entirety. Conversely, message passing networks (MPNs) take all the relations in the batch contents (e.g., batch contents 1000) of images into account. With message passing, embedding vectors can be refined by exchanging messages amongst all the samples in the batch and, as such, the training process can be aware of the overall structure. An attention mechanism may be utilized during the message passing to allow for the samples to weigh the importance of neighboring samples accordingly.

Figure 12:
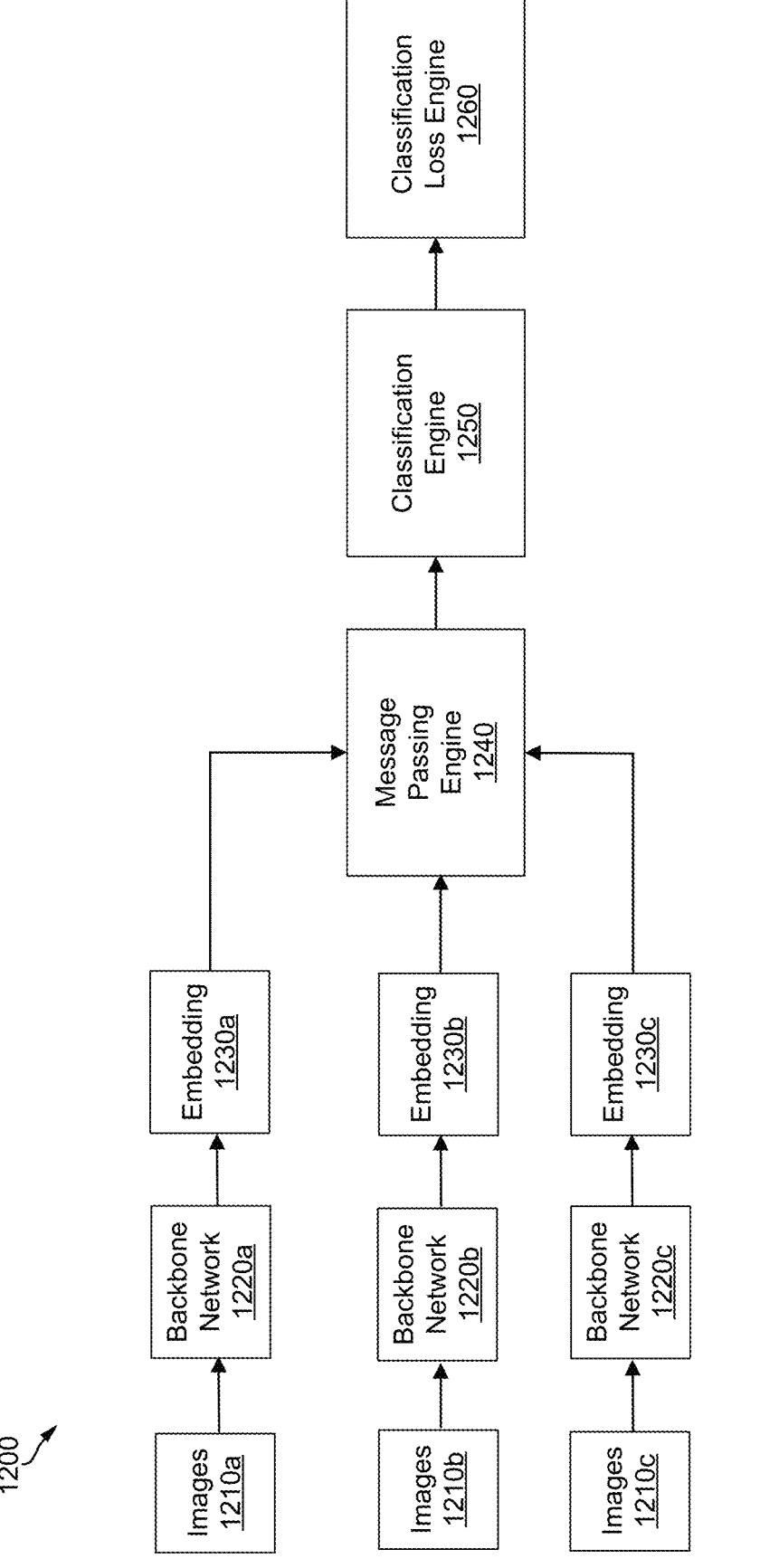
FIG. 12 is a diagram illustrating an example of a model for vehicle tracking that utilizes message passing, in accordance with some examples of the present disclosure.

FIG. 12 is a diagram illustrating an example of a model 1200 for vehicle tracking that utilizes message passing. In FIG. 12, a batch including N number of sets (e.g., classes) 1210a, 1210b, 1210c of images of a batch (e.g., batch contents) is shown. Each set 1210a, 1210b, 1210c of images contains P number of images. For example, the sets 1210a, 1210b, 1210c of images may each contain images of a different class (or type) of vehicle.

During operation of the model 1200 for vehicle tracking, each set 1210a, 1210b, 1210c of images can be input into a respective backbone network 1210a, 1210b, 1210c (e.g., a CNN). Weights and other parameters (e.g., biases, etc.) may be shared across the backbone networks 1210a, 1210b, 1210c to tune the backbone networks 1210a, 1210b, 1210c (e.g., the backbone networks may be weighted with the same weights).

The backbone networks 1210a, 1210b, 1210c can extract features (e.g., compute the initial embeddings 1230a, 1230b, 1230c) from the sets 1210a, 1210b, 1210c of images. A message passing engine 1240 can a generate fully-connected graph that can be constructed to include nodes, where each node represents a feature (e.g., an embedding). As such, every node with initial node features $$h_i^0 = f$$

is connected to all the other nodes in the graph.

To refine the initial feature vectors (e.g., initial embeddings), message passing occurs (e.g., within the message passing engine 1240) between the nodes in the graph to exchange information between the nodes. In one or more examples, the message passing engine 1240 can perform L number of message passing steps successively. For each message passing step, messages may be passed between all of the nodes, and updated features $$h_i^{l+1}$$

of node i can be obtained at message passing step l+1 by aggregating the features $$h_j^l$$

of all the neighboring nodes $j \in N_i$ at message passing step l:

$$h_i^{l+1} = \sum_{j \in N_i} W^l h_j^l \qquad \text{Equation (2)}$$

where $W^l$ is the corresponding weight matrix of message passing step 1. As the fully-constructed graph is being constructed by the message passing engine 1240, the neighboring nodes Ni may include all of the nodes in the batch and, as such, each feature representation of an image can be affected by all the other images in the batch.

The message passing engine 1240 may add an attention score a at every message passing step to allow for each sample (e.g., node) to weigh the importance of the other samples (e.g., nodes) in the batch:

$$h_i^{l+1} = \sum_{j \in N_i} \propto_{ij}^l W^l h_j^l \qquad \text{Equation (3)}$$

where $\alpha_{ij}$ is the attention score between node i and node j. The dot-product self-attention is utilized to compute the attention scores that leads to $\alpha_{ij}$ at step 1 to be defined as:

$$\propto_{ij}^l = \frac{W_q^l h_i^l (W_k^l h_j^l)^T}{\sqrt{d}} \qquad \text{Equation (4)}$$

where $$W_q^l$$

is a weight matrix corresponding to a receiving node, d is the dimension of the initial embeddings 1230a, 1230b, 1230c, and $$W_k^l$$

is a weight matrix corresponding to a sending node on message passing step 1. The message passing engine 1240 may apply a softmax function to all in-going attention scores (e.g., edges) of a given node i. To allow for the MPN to learn a diverse set of attention scores, M dot product self-attention heads can be applied by the message passing engine 1240 in every message passing step, and the results can be concatenated. Instead of using single weight matrices $$W_q^l, W_k^l,$$

and $W^l$, different weight matrices $$W_q^{l,m} \in R^{\frac{d}{M} \times d}, W_k^{l,m} \in R^{\frac{d}{M} \times d},$$

and $$W^{l,m} \in R^{\frac{d}{M} \times d}$$

and may be used for each attention head:

$$h_i^{l+1} = \text{cat}\left( \sum_{j \in N_i} \propto_{ij}^{l,1} W^{l,1} h_j^l, \dots, \sum_{j \in N_i} \propto_{ij}^{l,M} W^{l,M} h_j^l \right) \qquad \text{Equation (5)}$$

where cat represents concatenation.

By using the attention-head specific weight matrices, the dimension of all of the embeddings $$h_j^l$$

can be reduced by $$\frac{1}{M}$$

such that when the embeddings generated by all of the attention heads are concatenated, the resulting embedding $$h_i^{l+1}$$

can have the same dimension as the input embedding $$h_i^l.$$

After the message passing engine 1240 has performed all of the message passing steps, the results (e.g., refined, final embeddings) may be input into a classification engine 1250. In one or more examples, the classification engine 1250 may determine one or more classifications for one or more objects in the image (or classify the entire image) using the final embeddings. A classification loss engine 1260 may determine a classification loss based on the classification from the classification engine 1250. For instance, the classification loss engine 1260 may compute a classification loss (e.g., utilizing the triplet loss or the FAT loss, cross-entropy loss, or other loss) using the final embeddings or using the classification result.

Based on the determined classification loss determined by the classification loss engine 1260, back propagation can be performed to tune the parameters (e.g., the weights, biases, and/or other parameters) of the network in order to obtain more accurate classification results. As such, the weights for the backbone networks 1220a, 1220b, 1220c can be adjusted for the next batch of images to be input into the backbone networks 1220a, 1220b, 1220c for feature extraction. The tuning of the weights and the process can be repeated for a certain number of times or until a level of accuracy of the classification has been achieved.

FIG. 13 is a flow chart illustrating an example of a process 1300 for processing image data using message passing network based object signatures as described herein. The process 1300 can be performed by a computing device (or apparatus), or a component or system (e.g., a chipset) of the computing device. In one illustrative example, the computing device (or component or system thereof) can include or can be the model 1200 of FIG. 12. The operations of the process 1300 may be implemented as software components that are executed and run on one or more processors (e.g., processor 1410 of FIG. 14 or other processor(s)).

At block 1310, the computing device (or component thereof) can compute initial embeddings from a plurality of images (e.g., the embedding 1230*a*, the embedding 1230*b*, and/or the embedding 1230*c* of FIG. 12). In some aspects, the computing device (or component thereof) can compute the initial embeddings using a neural network, such as using a backbone network (e.g., the backbone network 1220*a*, the backbone network 1220*b*, and/or the backbone network 1220*c* of FIG. 12). In some cases, the computing device (or component thereof) can obtain the plurality of images (e.g., the images 1210*a*, the images 1210*b*, and/or the images 1210*c* of FIG. 12). In some cases, the neural network (e.g., the backbone network) can be a convolutional neural network (CNN) or other type of neural network.

At block 1320, the computing device (or component thereof) can construct a graph (e.g., a fully-connected graph) comprising nodes representing the initial embeddings. In some aspects, the computing device (or component thereof) can construct the graph using a message passing engine (e.g., the message passing engine 1240).

At block 1330, the computing device (or component thereof) can perform based on the graph (e.g., the fully-connected graph), a plurality of message passing steps successively to generate final embeddings. In some cases, the computing device (or component thereof) can perform the message passing steps using the message passing engine (e.g., the message passing engine 1240). In some aspects, the computing device (or component thereof) can apply (e.g., using the message passing engine) an attention score at each of the plurality of message passing steps for each of the nodes of the graph (e.g., the fully-connected graph) to weigh an importance of neighboring nodes. In some cases, the messages are passed between all of the nodes of the graph (e.g., the fully-connected graph) during each of the plurality of message passing steps.

At block 1340, the computing device (or component thereof) can classify, using a classification engine (e.g., the classification engine 1250), one or more objects in each of the plurality of images based on the final embeddings.

At block 1350, the computing device (or component thereof) can compute a classification loss (e.g., using the classification engine 1250) based on the classifying of the one or more objects. In some examples, the classification loss is based on a triplet loss, a fast-approximated triplet (FAT) loss, and/or other loss(es). The computing device (or component thereof) can tune one or more weights for the neural network (e.g., the backbone network) based on the classification loss. In some aspects, the computing device (or component thereof) can apply, using the classification engine, a cross-entropy loss to the final embeddings.

As noted previously, the processes described herein (e.g., process 1300 and/or other process described herein) may be performed by a computing device or apparatus. In one example, the process 1300 can be performed by the computing system 1400 shown in FIG. 14. The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the process 1300, and/or other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 1300 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 1300 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 14:
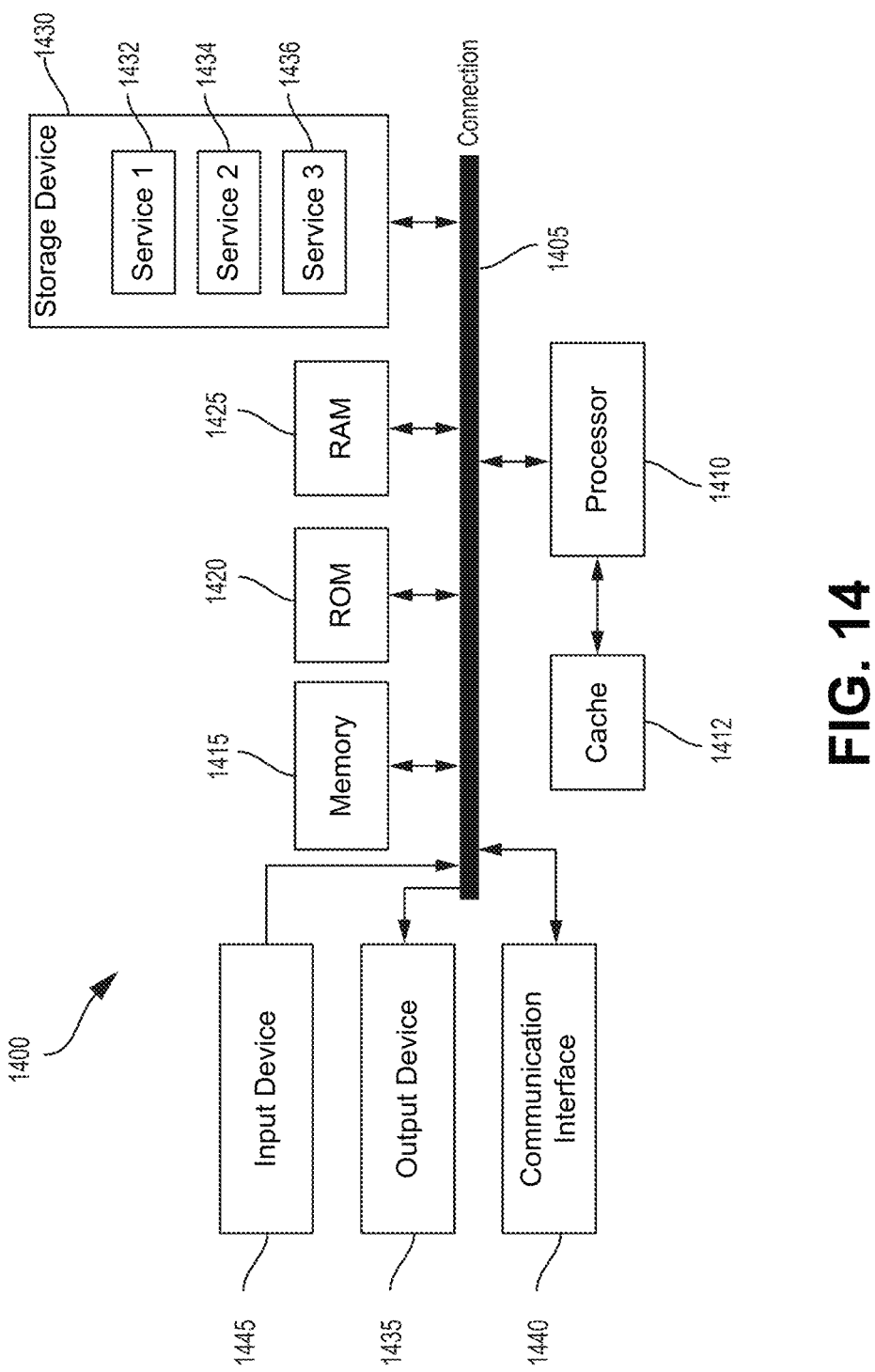
FIG. 14 illustrates an example computing system, in accordance with some examples of the present disclosure.

FIG. 14 is a diagram illustrating an example of a system for implementing certain aspects of the present technology. In particular, FIG. 14 illustrates an example of computing system 1400, which can be for example any computing device making up internal computing system, a remote computing system, a camera, or any component thereof in which the components of the system are in communication with each other using connection 1405. Connection 1405 can be a physical connection using a bus, or a direct connection into processor 1410, such as in a chipset architecture. Connection 1405 can also be a virtual connection, networked connection, or logical connection.

In some aspects, computing system 1400 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1400 includes at least one processing unit (CPU or processor) 1410 and connection 1405 that couples various system components including system memory 1415, such as read-only memory (ROM) 1420 and random access memory (RAM) 1425 to processor 1410. Computing system 1400 can include a cache 1412 of high-speed memory connected directly with, in close proximity to, or integrated as part of processor 1410.

Processor 1410 can include any general purpose processor and a hardware service or software service, such as services 1432, 1434, and 1436 stored in storage device 1430, configured to control processor 1410 as well as a special-purpose processor where software instructions are incorporated into the actual processor design. Processor 1410 may essentially be a completely self-contained computing system, containing multiple cores or processors, a bus, memory controller, cache, etc. A multi-core processor may be symmetric or asymmetric.

To enable user interaction, computing system 1400 includes an input device 1445, which can represent any number of input mechanisms, such as a microphone for speech, a touch-sensitive screen for gesture or graphical input, keyboard, mouse, motion input, speech, etc. Computing system 1400 can also include output device 1435, which can be one or more of a number of output mechanisms. In some instances, multimodal systems can enable a user to provide multiple types of input/output to communicate with computing system 1400. Computing system 1400 can include communications interface 1340, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1440 may also include one or more Global Navigation Satellite System (GNSS) receivers or transceivers that are used to determine a location of the computing system 1400 based on receipt of one or more signals from one or more satellites associated with one or more GNSS systems. GNSS systems include, but are not limited to, the US-based Global Positioning System (GPS), the Russia-based Global Navigation Satellite System (GLO- NASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1430 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memory storage, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1430 can include software services, servers, services, etc., that when the code that defines such software is executed by the processor 1410, it causes the system to perform a function. In some aspects, a hardware service that performs a particular function can include the software component stored in a computer-readable medium in connection with the necessary hardware components, such as processor 1410, connection 1405, output device 1435, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, engines, circuits, and algorithm steps described in connection with the examples disclosed herein may be implemented as electronic hardware, computer software, firmware, or combinations thereof. To clearly illustrate this interchangeability of hardware and software, various illustrative components, blocks, engines, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as engines, modules, or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative examples of the disclosure include:

Aspect 1. A processor-implemented method of processing image data, comprising: computing initial embeddings from a plurality of images; constructing a graph comprising nodes representing the initial embeddings; performing based on the graph, a plurality of message passing steps successively to generate final embeddings; classifying, using a classification engine, one or more objects in each of the plurality of images based on the final embeddings; and computing a classification loss based on the classifying of the one or more objects.

Aspect 2. The processor-implemented method of Aspect 1, wherein the initial embeddings are computed using a neural network.

Aspect 3. The processor-implemented method of Aspect 2, further comprising tuning one or more weights of the neural network based on the classification loss.

Aspect 4. The processor-implemented method of any one of Aspects 1 to 3, wherein the graph is constructed using a message passing neural network.

Aspect 5. The processor-implemented method of Aspect 4, wherein the plurality of message passing steps are performed using the message passing neural network.

Aspect 6. The processor-implemented method of any one of Aspects 1 to 5, further comprising applying an attention score at each of the plurality of message passing steps for each of the nodes of the graph to weigh an importance of neighboring nodes.

Aspect 7. The processor-implemented method of any one of Aspects 1 to 6, wherein messages are passed between all of the nodes of the graph during each of the plurality of message passing steps.

Aspect 8. The processor-implemented method of any one of Aspects 1 to 7, wherein the classification loss is based on one of a triplet loss or a fast-approximated triplet (FAT) loss.

Aspect 9. The processor-implemented method of any one of Aspects 1 to 8, further comprising applying, by the classification engine, a cross-entropy loss to the final embeddings.

Aspect 10. The processor-implemented method of any one of Aspects 1 to 9, wherein the graph is a fully-connected graph.

Aspect 11. An apparatus for processing image data, comprising: at least one memory; and at least one processor coupled to the at least one memory and configured to: compute initial embeddings from a plurality of images; construct a graph comprising nodes representing the initial embeddings; perform, based on the graph, a plurality of message passing steps successively to generate final embeddings; classify, using a classification engine, one or more objects in each of the plurality of images based on the final embeddings; and compute a classification loss based on the classifying of the one or more objects.

Aspect 12. The apparatus of Aspect 11, wherein the at least one processor is configured to compute the initial embeddings using a neural network.

Aspect 13. The apparatus of Aspect 12, wherein the at least one processor is configured to tune one or more weights of the neural network based on the classification loss.

Aspect 14. The apparatus of any one of Aspects 11 to 13, wherein the at least one processor is configured to construct the graph using a message passing neural network.

Aspect 15. The apparatus of Aspect 14, wherein the at least one processor is configured to perform the plurality of message passing steps using the message passing neural network.

Aspect 16. The apparatus of any one of Aspects 11 to 15, wherein the at least one processor is configured to apply an attention score at each of the plurality of message passing steps for each of the nodes of the graph to weigh an importance of neighboring nodes.

Aspect 17. The apparatus of any one of Aspects 11 to 16, wherein the at least one processor is configured to pass messages between all of the nodes of the graph during each of the plurality of message passing steps.

Aspect 18. The apparatus of any one of Aspects 11 to 17, wherein the classification loss is based on one of a triplet loss or a fast-approximated triplet (FAT) loss.

Aspect 19. The apparatus of any one of Aspects 11 to 18, wherein the at least one processor is configured to apply, using the classification engine, a cross-entropy loss to the final embeddings.

Aspect 20. The apparatus of any one of Aspects 11 to 19, wherein the graph is a fully-connected graph.

Aspect 21. A non-transitory computer-readable medium having stored thereon instructions that, when executed by one or more processors, cause the one or more processors to perform operations according to any of Aspects 1 to 10.

Aspect 22. An apparatus for processing image data, the apparatus including one or more means for performing operations according to any of Aspects 1 to 10.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. A processor-implemented method of processing image data, comprising:

computing initial embeddings from a plurality of images, wherein the initial embeddings comprise baseline object signatures for objects represented in the plurality of images;

constructing a graph comprising nodes and edges, the nodes representing the initial embeddings of respective objects represented in the plurality of images, each edge having an edge weight based on similarity between the baseline object signatures of the respective objects;

performing based on the graph, a plurality of message passing steps to generate final embeddings;

classifying, using a classification engine, one or more objects in each of the plurality of images based on the final embeddings; and adjusting an operation of a vehicle based on the classifying of the one or more objects.

2. The processor-implemented method of claim 1, wherein the initial embeddings are computed using a neural network.

3. The processor-implemented method of claim 2, further comprising tuning one or more weights of the neural network based on a classification loss computed based on the classifying of the one or more objects.

4. The processor-implemented method of claim 1, wherein the graph is constructed using a message passing neural network.

5. The processor-implemented method of claim 4, wherein the plurality of message passing steps are performed using the message passing neural network.

6. The processor-implemented method of claim 1, further comprising applying an attention score at each of the plurality of message passing steps for each of the nodes of the graph to weigh an importance of neighboring nodes.

7. The processor-implemented method of claim 1, wherein messages are passed between all of the nodes of the graph during each of the plurality of message passing steps.

8. The processor-implemented method of claim 3, wherein the classification loss is based on one of a triplet loss or a fast-approximated triplet (FAT) loss.

9. The processor-implemented method of claim 1, further comprising applying, by the classification engine, a cross-entropy loss to the final embeddings.

10. The processor-implemented method of claim 1, wherein the graph is a fully-connected graph.

11. An apparatus for processing image data, comprising:
at least one memory; and
at least one processor coupled to the at least one memory and configured to:
   compute initial embeddings from a plurality of images, wherein the initial embeddings comprise baseline object signatures for objects represented in the plurality of images;
   construct a graph comprising nodes and edges, the nodes representing the initial embeddings of respective objects represented in the plurality of images, each edge having an edge weight based on similarity between the baseline object signatures of the respective objects;
   perform, based on the graph, a plurality of message passing steps to generate final embeddings;
   classify, using a classification engine, one or more objects in each of the plurality of images based on the final embeddings; and
   adjust an operation of a vehicle based on the classifying of the one or more objects.

12. The apparatus of claim 11, wherein the at least one processor is configured to compute the initial embeddings using a neural network.

13. The apparatus of claim 12, wherein the at least one processor is configured to tune one or more weights of the neural network based on a classification loss computed based on the classifying of the one or more objects.

14. The apparatus of claim 11, wherein the at least one processor is configured to construct the graph using a message passing neural network.

15. The apparatus of claim 14, wherein the at least one processor is configured to perform the plurality of message passing steps using the message passing neural network.

16. The apparatus of claim 11, wherein the at least one processor is configured to apply an attention score at each of the plurality of message passing steps for each of the nodes of the graph to weigh an importance of neighboring nodes.

17. The apparatus of claim 11, wherein the at least one processor is configured to pass messages between all of the nodes of the graph during each of the plurality of message passing steps.

18. The apparatus of claim 13, wherein the classification loss is based on one of a triplet loss or a fast-approximated triplet (FAT) loss.

19. The apparatus of claim 11, wherein the at least one processor is configured to apply, using the classification engine, a cross-entropy loss to the final embeddings.

20. The apparatus of claim 11, wherein the graph is a fully-connected graph.

* * * * *